United States Patent
Abotabl et al.

(10) Patent No.: US 12,213,084 B2
(45) Date of Patent: Jan. 28, 2025

(54) APERIODIC TRACKING REFERENCE SIGNAL TRIGGERING MECHANISM TO UPDATE TRACKING REFERENCE SIGNAL POWER

(71) Applicant: QUALCOMM Incorporated, San Diego, CA (US)

(72) Inventors: Ahmed Attia Abotabl, San Diego, CA (US); Hung Dinh Ly, San Diego, CA (US); Yu Zhang, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 17/728,719

(22) Filed: Apr. 25, 2022

(65) Prior Publication Data

US 2023/0345386 A1    Oct. 26, 2023

(51) Int. Cl.
*H04W 52/36*    (2009.01)
*H04L 5/00*    (2006.01)
(Continued)

(52) U.S. Cl.
CPC ......... *H04W 52/367* (2013.01); *H04L 5/0051* (2013.01); *H04W 24/08* (2013.01);
(Continued)

(58) Field of Classification Search
CPC ... H04W 52/367; H04W 24/08; H04W 24/10; H04W 52/143; H04W 72/1263;
(Continued)

(56) References Cited

U.S. PATENT DOCUMENTS 9,198,141 B2 * 11/2015 Papasakellariou .... H04W 52/18
10,944,530 B2 * 3/2021 Noh .................... H04W 72/23
(Continued)

OTHER PUBLICATIONS

Qualcomm Incorporated, "Remaining Issues on TRS", R1-1804795, 3GPP TSG RAN WG1 Meeting #92bis, Apr. 7, 2018 (Year: 2018).*
(Continued)

*Primary Examiner* — Ayaz R Sheikh
*Assistant Examiner* — Tarell A Hampton
(74) *Attorney, Agent, or Firm* — Holland & Hart LLP

(57) ABSTRACT

Methods, systems, and devices for wireless communications are described. A user equipment (UE) may receive control signaling from a network entity scheduling a set of multiple periodic tracking reference signals (TRSs) and indicating a transmission power level for the periodic TRSs. For example, the control signaling may be received via radio resource control (RRC). The UE may receive a downlink control information (DCI) message from the network entity indicating an adjustment to the transmission power level and a resource for an aperiodic TRS. The UE may monitor the resource for the aperiodic TRS in accordance with the indicated adjustment to the transmission power level. The UE may transmit a message to the network entity indicating a measurement of the aperiodic TRS based on the adjustment to the power level. The adjustment to the power level may apply to one or more of the set of multiple periodic TRSs.

30 Claims, 20 Drawing Sheets

(51) Int. Cl.
*H04W 24/08* (2009.01)
*H04W 24/10* (2009.01)
*H04W 52/14* (2009.01)
*H04W 72/1263* (2023.01)
*H04W 72/23* (2023.01)

(52) U.S. Cl.
CPC ......... *H04W 24/10* (2013.01); *H04W 52/143* (2013.01); *H04W 72/1263* (2013.01); *H04W 72/23* (2023.01)

(58) Field of Classification Search
CPC .. H04W 72/23; H04W 52/325; H04L 5/0051; H04L 5/0048
See application file for complete search history.

(56) References Cited

U.S. PATENT DOCUMENTS

| | | | | |
|---|---|---|---|---|
| 11,258,566 | B2* | 2/2022 | Nam | H04W 76/27 |
| 2010/0254471 | A1* | 10/2010 | Ko | H04L 5/0023 |
| | | | | 375/260 |
| 2015/0358111 | A1* | 12/2015 | Marinier | H04W 72/23 |
| | | | | 370/329 |
| 2018/0205526 | A1* | 7/2018 | Kim | H04L 1/0026 |
| 2019/0116012 | A1* | 4/2019 | Nam | H04L 5/0085 |
| 2019/0215117 | A1* | 7/2019 | Lee | H04L 5/0078 |
| 2019/0260447 | A1* | 8/2019 | Nam | H04W 72/0453 |
| 2019/0312621 | A1* | 10/2019 | Nam | H04W 72/23 |
| 2019/0349864 | A1* | 11/2019 | Zhang | H04W 52/325 |
| 2019/0356444 | A1* | 11/2019 | Noh | H04W 72/23 |
| 2020/0366351 | A1* | 11/2020 | Karjalainen | H04W 76/27 |
| 2021/0067291 | A1* | 3/2021 | Gao | H04L 5/0048 |
| 2021/0105111 | A1* | 4/2021 | Yoon | H04L 5/0051 |
| 2021/0136532 | A1* | 5/2021 | Liu | H04W 48/10 |
| 2021/0203464 | A1* | 7/2021 | Ren | H04L 5/0062 |
| 2021/0329517 | A1* | 10/2021 | Noh | H04L 5/0048 |
| 2021/0359812 | A1* | 11/2021 | Bai | H04L 5/0048 |
| 2022/0279451 | A1* | 9/2022 | Yoshioka | H04W 52/383 |
| 2022/0322231 | A1* | 10/2022 | Sun | H04W 52/0229 |
| 2022/0407576 | A1* | 12/2022 | Muruganathan | H04L 5/0048 |
| 2022/0408523 | A1* | 12/2022 | Zhang | H04L 5/0048 |
| 2023/0078444 | A1* | 3/2023 | Maleki | H04L 5/0094 |
| | | | | 370/311 |
| 2023/0198706 | A1* | 6/2023 | Maleki | H04L 5/0051 |
| | | | | 370/329 |
| 2023/0328656 | A1* | 10/2023 | Rudolf | H04W 52/325 |
| | | | | 455/522 |
| 2023/0388072 | A1* | 11/2023 | Munier | H04W 76/20 |
| 2024/0057197 | A1* | 2/2024 | Gurumoorthy | H04W 52/0229 |
| 2024/0063991 | A1* | 2/2024 | Liu | H04L 5/0094 |
| 2024/0080152 | A1* | 3/2024 | Shrivastava | H04W 52/235 |
| 2024/0106600 | A1* | 3/2024 | Hasanzadezonuzy | |
| | | | | H04L 5/0048 |
| 2024/0267165 | A1* | 8/2024 | Liu | H04L 5/0005 |

OTHER PUBLICATIONS

Huawei et al., "Further discussion on introducing aperiodic TRS", R1-1804443, 3GPP TSG RAN WG1 Meeting #92bis, Apr. 7, 2018 (Year: 2018).*

Nokia et al., "Remaining Details of TRS Design", R1-1805112, 3GPP TSG RAN WG1 Meeting #92bis, Apr. 7, 2018 (Year: 2018).*

Vivo, "Remaining issues on TRS", R1-1803826, 3GPP TSG RAN WG1 NR #92bis, Apr. 6, 2018. (Year: 2018).*

Qualcomm Incorporated, "Remaining Issues on TRS", R1-1800866, 3GPP TSG RAN WG1 Meeting AH1801, Vancouver, Canada, Jan. 26, 2018. (Year: 2018).*

Ericsson, "Corrections related to TRS", R1-1800709, 3GPP TSG RAN WG1 Meeting AH1801, Vancouver, Canada, Jan. 26, 2018. (Year: 2018).*

* cited by examiner

APERIODIC TRACKING REFERENCE SIGNAL TRIGGERING MECHANISM TO UPDATE TRACKING REFERENCE SIGNAL POWER

FIELD OF TECHNOLOGY

The following relates to wireless communications, including aperiodic tracking reference signal triggering mechanism to update tracking reference signal power.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support aperiodic tracking reference signal (TRS) triggering mechanism to update tracking reference signal power. For example, the described techniques provide for signaling to a user equipment (UE) of an adjustment to the transmission power level of TRSs. A UE may receive control signaling (e.g., from a network entity) scheduling a set of multiple periodic TRSs and indicating a transmission power level for the periodic TRSs. For example, the control signaling may be received via radio resource control (RRC). The UE may receive a downlink control information (DCI) message (e.g., from the network entity) indicating an adjustment to the transmission power level and a resource for an aperiodic TRS. The UE may monitor the resource for the aperiodic TRS in accordance with the indicated adjustment to the transmission power level. The UE may transmit a message to the network entity indicating a measurement of the aperiodic TRS based on the adjustment to the transmission power level. The adjustment to the transmission power level may apply to the one or more of the set of multiple periodic TRSs. For example, the adjustment to the transmission power level may apply for a set duration after the adjustment, or the adjustment to the transmission power level may apply to all periodic TRSs (e.g., until a subsequent adjustment). In some cases, the DCI scheduling the aperiodic TRS may include a defined field indicating the adjustment to the transmission power level. In some cases, the frequency domain resource allocation (FDRA) of the DCI scheduling the aperiodic TRS may include a defined value to indicate the adjustment to the transmission power level.

A method for wireless communications at a user equipment (UE) is described. The method may include receiving, from a network entity, control signaling scheduling a set of multiple periodic TRSs and indicating a transmission power level for at least one of the set of multiple periodic TRSs, receiving, from the network entity, a DCI message indicating an adjustment to the transmission power level and a resource allocated for an aperiodic TRS, monitoring the resource for the aperiodic TRS in accordance with the DCI message, and transmitting, to the network entity, a message indicating a measurement of the aperiodic TRS in the resource based on the adjustment to the transmission power level.

An apparatus for wireless communications at a UE is described. The apparatus may include a processor, memory coupled with the processor, and instructions stored in the memory. The instructions may be executable by the processor to cause the apparatus to receive, from a network entity, control signaling scheduling a set of multiple periodic TRSs and indicating a transmission power level for at least one of the set of multiple periodic TRSs, receive, from the network entity, a DCI message indicating an adjustment to the transmission power level and a resource allocated for an aperiodic TRS, monitor the resource for the aperiodic TRS in accordance with the DCI message, and transmit, to the network entity, a message indicating a measurement of the aperiodic TRS in the resource based on the adjustment to the transmission power level.

Another apparatus for wireless communications at a UE is described. The apparatus may include means for receiving, from a network entity, control signaling scheduling a set of multiple periodic TRSs and indicating a transmission power level for at least one of the set of multiple periodic TRSs, means for receiving, from the network entity, a DCI message indicating an adjustment to the transmission power level and a resource allocated for an aperiodic TRS, means for monitoring the resource for the aperiodic TRS in accordance with the DCI message, and means for transmitting, to the network entity, a message indicating a measurement of the aperiodic TRS in the resource based on the adjustment to the transmission power level.

A non-transitory computer-readable medium storing code for wireless communications at a UE is described. The code may include instructions executable by a processor to receive, from a network entity, control signaling scheduling a set of multiple periodic TRSs and indicating a transmission power level for at least one of the set of multiple periodic TRSs, receive, from the network entity, a DCI message indicating an adjustment to the transmission power level and a resource allocated for an aperiodic TRS, monitor the resource for the aperiodic TRS in accordance with the DCI message, and transmit, to the network entity, a message indicating a measurement of the aperiodic TRS in the resource based on the adjustment to the transmission power level.

In some examples of the method, apparatuses, and non-transitory computer-readable medium described herein, receiving the DCI message indicating the adjustment to the transmission power level may include operations, features, means, or instructions for receiving the DCI message including an uplink grant for the UE and a TRS transmission power level adjustment field.

In some examples of the method, apparatuses, and non-transitory computer-readable medium described herein, receiving the DCI message indicating the adjustment to the transmission power level may include operations, features, means, or instructions for receiving the DCI message including an FDRA set to a defined value to indicate that a field of the DCI message indicates the adjustment to the transmission power level.

Some examples of the method, apparatuses, and non-transitory computer-readable medium described herein may further include operations, features, means, or instructions for receiving second control signaling indicating a channel state information reporting configuration including a set of multiple trigger states corresponding to a respective set of multiple TRS transmission power levels, and where the DCI message indicates a trigger state of the set of multiple trigger states.

Some examples of the method, apparatuses, and non-transitory computer-readable medium described herein may further include operations, features, means, or instructions for generating a channel state information report in accordance with the channel state information reporting configuration and based on the adjustment to the transmission power level, where the message indicating the measurement of the aperiodic TRS includes the channel state information report.

Some examples of the method, apparatuses, and non-transitory computer-readable medium described herein may further include operations, features, means, or instructions for receiving, with the control signaling, an indication of a duration for transmission power level adjustment, where the adjustment to the transmission power level applies to one or more periodic TRSs of the set of multiple periodic TRSs scheduled for transmission within the duration after the DCI message indicating the adjustment to the transmission power level.

Some examples of the method, apparatuses, and non-transitory computer-readable medium described herein may further include operations, features, means, or instructions for receiving, with the control signaling, an indication that power level adjustments apply to one or more periodic TRSs of the set of multiple periodic TRSs scheduled for transmission after a future adjustment to the transmission power level.

Some examples of the method, apparatuses, and non-transitory computer-readable medium described herein may further include operations, features, means, or instructions for receiving, with the DCI message, an indication of a duration for transmission power level adjustment, where the adjustment to the transmission power level applies to one or more periodic TRSs of the set of multiple periodic TRSs scheduled for transmission within the duration after the DCI message indicating the adjustment to the transmission power level.

Some examples of the method, apparatuses, and non-transitory computer-readable medium described herein may further include operations, features, means, or instructions for receiving, with the DCI message, an indication that power level adjustments apply to one or more periodic TRSs of the set of multiple periodic TRSs scheduled for transmission after a future adjustment to the transmission power level.

Some examples of the method, apparatuses, and non-transitory computer-readable medium described herein may further include operations, features, means, or instructions for performing a set of automatic gain control procedures based on the set of multiple periodic TRSs and in accordance with the adjustment to the transmission power level.

In some examples of the method, apparatuses, and non-transitory computer-readable medium described herein, the DCI message indicates the adjustment to the transmission power level as an offset relative to a reference transmission power level.

In some examples of the method, apparatuses, and non-transitory computer-readable medium described herein, the DCI message indicates the adjustment to the transmission power level as an offset relative to the transmission power level of the at least one of the set of multiple periodic TRSs.

A method for wireless communications at a network entity is described. The method may include transmitting, to a UE, control signaling scheduling a set of multiple periodic TRSs and indicating a transmission power level for at least one of the set of multiple periodic TRSs, transmitting, to the UE, a DCI message indicating an adjustment to the transmission power level and a resource allocated for an aperiodic TRS, transmitting the aperiodic TRS using the resource in accordance with the DCI message, and receiving, from the UE, a message indicating a measurement of the aperiodic TRS in the resource based on the adjustment to the transmission power level.

An apparatus for wireless communications at a network entity is described. The apparatus may include a processor, memory coupled with the processor, and instructions stored in the memory. The instructions may be executable by the processor to cause the apparatus to transmit, to a UE, control signaling scheduling a set of multiple periodic TRSs and indicating a transmission power level for at least one of the set of multiple periodic TRSs, transmit, to the UE, a DCI message indicating an adjustment to the transmission power level and a resource allocated for an aperiodic TRS, transmit the aperiodic TRS using the resource in accordance with the DCI message, and receive, from the UE, a message indicating a measurement of the aperiodic TRS in the resource based on the adjustment to the transmission power level.

Another apparatus for wireless communications at a network entity is described. The apparatus may include means for transmitting, to a UE, control signaling scheduling a set of multiple periodic TRSs and indicating a transmission power level for at least one of the set of multiple periodic TRSs, means for transmitting, to the UE, a DCI message indicating an adjustment to the transmission power level and a resource allocated for an aperiodic TRS, means for transmitting the aperiodic TRS using the resource in accordance with the DCI message, and means for receiving, from the UE, a message indicating a measurement of the aperiodic TRS in the resource based on the adjustment to the transmission power level.

A non-transitory computer-readable medium storing code for wireless communications at a network entity is described. The code may include instructions executable by a processor to transmit, to a UE, control signaling scheduling a set of multiple periodic TRSs and indicating a transmission power level for at least one of the set of multiple periodic TRSs, transmit, to the UE, a DCI message indicating an adjustment to the transmission power level and a resource allocated for an aperiodic TRS, transmit the aperiodic TRS using the resource in accordance with the DCI message, and receive, from the UE, a message indicating a measurement of the aperiodic TRS in the resource based on the adjustment to the transmission power level.

In some examples of the method, apparatuses, and non-transitory computer-readable medium described herein, transmitting the DCI message indicating the adjustment to the transmission power level may include operations, features, means, or instructions for transmitting the DCI message including an uplink grant for the UE and a TRS transmission power level adjustment field.

In some examples of the method, apparatuses, and non-transitory computer-readable medium described herein, transmitting the DCI message indicating the adjustment to the transmission power level may include operations, features, means, or instructions for transmitting the DCI message including an FDRA set to a defined value to indicate that a field of the DCI message indicates the adjustment to the transmission power level.

Some examples of the method, apparatuses, and non-transitory computer-readable medium described herein may further include operations, features, means, or instructions for transmitting second control signaling indicating a channel state information reporting configuration including a set of multiple trigger states corresponding to a respective set of multiple TRS transmission power levels, and where the DCI message indicates a trigger state of the set of multiple trigger states.

In some examples of the method, apparatuses, and non-transitory computer-readable medium described herein, receiving the message indicating the measurement of the aperiodic TRS in the resource may include operations, features, means, or instructions for receiving a channel state information report in accordance with the channel state information reporting configuration and based on the adjustment to the transmission power level.

Some examples of the method, apparatuses, and non-transitory computer-readable medium described herein may further include operations, features, means, or instructions for transmitting, with the control signaling, an indication of a duration for transmission power level adjustment, where the adjustment to the transmission power level applies to one or more periodic TRSs of the set of multiple periodic TRSs scheduled for transmission within the duration after the DCI message indicating the adjustment to the transmission power level.

Some examples of the method, apparatuses, and non-transitory computer-readable medium described herein may further include operations, features, means, or instructions for transmitting, with the control signaling, an indication that power level adjustments apply to one or more periodic TRSs of the set of multiple periodic TRSs scheduled for transmission after a future adjustment to the transmission power level.

Some examples of the method, apparatuses, and non-transitory computer-readable medium described herein may further include operations, features, means, or instructions for transmitting, with the DCI message, an indication of a duration for transmission power level adjustment, where the adjustment to the transmission power level applies to one or more periodic TRSs of the set of multiple periodic TRSs scheduled for transmission within the duration after the DCI message indicating the adjustment to the transmission power level.

Some examples of the method, apparatuses, and non-transitory computer-readable medium described herein may further include operations, features, means, or instructions for transmitting, with the DCI message, an indication that power level adjustments apply to one or more periodic TRSs of the set of multiple periodic TRSs scheduled for transmission after a future adjustment to the transmission power level.

In some examples of the method, apparatuses, and non-transitory computer-readable medium described herein, the DCI message indicates the adjustment to the transmission power level as an offset relative to a reference transmission power level.

In some examples of the method, apparatuses, and non-transitory computer-readable medium described herein, the DCI message indicates the adjustment to the transmission power level as an offset relative to the transmission power level of the at least one of the set of multiple periodic TRSs.

DETAILED DESCRIPTION

Figure 1:
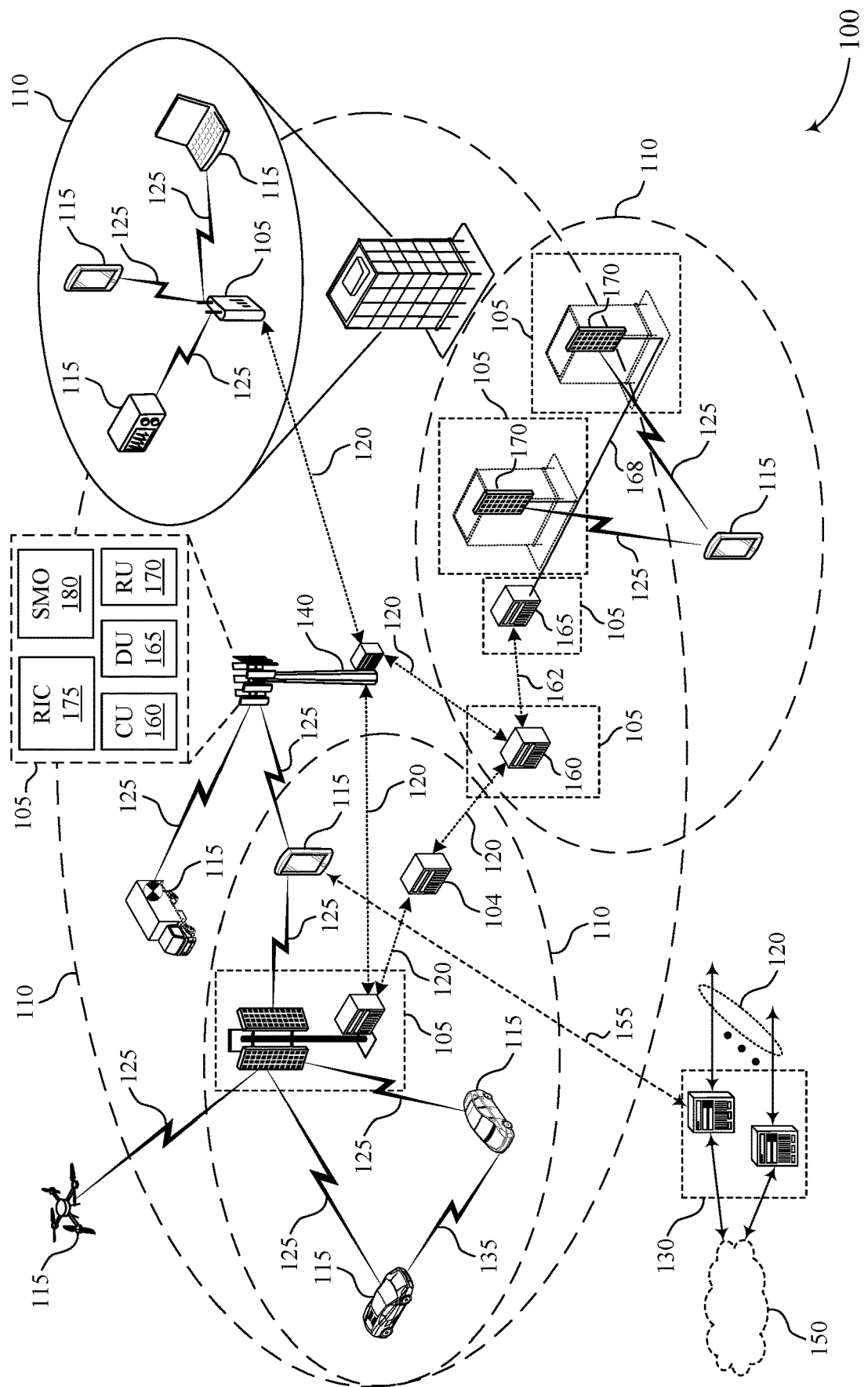
FIG. 1 illustrates an example of a wireless communications system that supports aperiodic tracking reference signal (TRS) triggering mechanism to update TRS power in accordance with one or more aspects of the present disclosure.

In wireless communications systems, a tracking reference signal (TRS) may be a downlink reference signal used to estimate channel characteristics (e.g., delay spread). For example, a user equipment (UE) may report measurements of TRSs to the network for channel estimation or a UE may utilize one or more TRSs to perform an automatic gain control (AGC) procedure. The network may indicate scheduling information for periodic TRSs via radio resource control (RRC). A TRS may be aperiodically triggered by a downlink control information (DCI) message. A TRS that is aperiodically triggered by a DCI message may be referred to as an aperiodic TRS. DCI messages may be associated with less latency than RRC. TRSs may be transmitted by a network entity using a configured transmission power level. To save energy, the network may adjust the transmission power of TRSs, for example depending of traffic or channel conditions. For example, to reduce energy usage, a network entity may reduce the transmission power level of TRSs during low load conditions. An adjustment in the transmission power level for TRSs may impact measurements and AGC procedures at a UE if the UE is unaware of the transmission power level.

The network may signal to a UE an adjustment to the transmission power level of TRSs. A UE may receive control signaling scheduling a set of multiple periodic TRSs and indicating a transmission power level for the periodic TRSs. For example, the control signaling may be received via RRC. The UE may receive a DCI message indicating an adjustment to the transmission power level and a resource for an aperiodic TRS. The UE may monitor the resource for the aperiodic TRS in accordance with the indicated adjustment to the transmission power level. The UE may transmit a message to the network entity indicating a measurement of the aperiodic TRS based on the adjustment to the transmission power level. The adjustment to the transmission power level may apply to the one or more of the set of multiple periodic TRSs. For example, the adjustment to the transmission power level may apply for a set duration after the adjustment, or the adjustment to the transmission power level may apply to all periodic TRSs (e.g., until a subsequent adjustment). Accordingly, the scheduling DCI for an aperiodic TRS may indicate an adjustment to the transmission power level for a set of multiple periodic TRSs. In some cases, the DCI scheduling the aperiodic TRS may include a defined field indicating the adjustment to the transmission power level. In some cases, the frequency domain resource allocation (FDRA) of the DCI scheduling the aperiodic TRS may include a defined value to indicate the adjustment to the transmission power level.

Aspects of the disclosure are initially described in the context of wireless communications systems. Aspects of the disclosure are further illustrated by and described with reference to timing diagrams and process flows. Aspects of the disclosure are further illustrated by and described with reference to apparatus diagrams, system diagrams, and flowcharts that relate to aperiodic TRS triggering mechanism to update TRS power.

FIG. 1 illustrates an example of a wireless communications system 100 that supports aperiodic TRS triggering mechanism to update TRS power in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170).

In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support aperiodic TRS triggering mechanism to update TRS power as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In the wireless communications system 100, a TRS may be a downlink reference signal used to estimate channel characteristics (e.g., delay spread). For example, a UE 115 may report measurements of TRSs to the network for channel estimation or a UE 115 may utilize one or more TRSs to perform an AGC procedure. The network may indicate scheduling information for periodic TRSs via RRC. A TRS may be aperiodically triggered by a DCI message. TRSs may be transmitted by a network entity 105 using a configured transmission power level.

An aperiodic TRS (e.g., an aperiodically scheduled TRS triggered by a DCI message) may be quasi co-located (QCL) with a set of periodic TRSs. In some examples, for periodic channel state information (CSI) reference signal (CSI-RS) configured with a higher layer parameter trs-info, a UE 115 may expect that a transmission configuration indicator (TCI) state indicates one of the following QCL type(s): (1) QCL typeC with an synchronization signal (SS) or physical broadcast channel (PBCH) block, and when applicable, QCL typeD with the SS or PBCH block; or (2) QCL typeC with an SS or PBCH block, and when applicable, QCL typeD with a CSI-RS resource in a non-zero power (NZP) CSI-RS resource set configured with the higher layer parameter repetition. For an aperiodic CSI-RS resource in an NZP CSI-RS resource set configured with the higher layer parameter trs-info, a UE 115 may expect that a TCI-state parameter indicates QCL typeA with a periodic CSI-RS resource in an NZP CSI-RS resource set configured with the higher layer parameter trs-info, and when applicable, QCL typeD with the same periodic CSI-RS resource.

In some examples, a UE 115 configured with a NZP CSI-RS resource set configured with the higher layer parameter trs-info may have the CSI-RS resource configured as periodic, with the CSI-RS resources in the NZP CSI-RS resource set configured with the same periodicity, bandwidth, and subcarrier location. In some examples, a UE 115 configured with a NZP CSI-RS resource set configured with the higher layer parameter trs-info may have the CSI-RS resource configured as a periodic CSI-RS resource in one set and an aperiodic CSI-RS resource in a second set, with the aperiodic CSI-RS and the periodic CSI-RS having the same bandwidth (with the same resource block location). The aperiodic CSI-RS resource may be configured with QCL typeA and typed, and where applicable, with the periodic CSI-RS resources. For FR2, a UE 115 may not expect that the scheduling offset between the last symbol of the physical downlink control channel (PDCCH) carrying the triggering DCI and the first symbol of the aperiodic CSI-RS resource is smaller than the parameter beamSwitchTiming+d. In some examples, a UE 115 may not expect to be configured with a CSI reporting configuration that is linked to a CSI resource configuration containing an NZP CSI-RS resource set configured with the parameter trs-info and with the CSI reporting configuration configured with the higher layer parameter timeRestrictionForChannelMeasurements set to 'configured'. In some examples, a UE 115 may not expect to be configured with a CSI reporting configuration with the higher layer parameter reportQuantity set to other than 'none' for a aperiodic NZP CSI-RS resource set configured with the parameter trs-info.

In some cases, an aperiodic TRS may be triggered via an uplink grant without a physical uplink shared channel (PUSCH) transmission (e.g., via a DCI message). For example, in some cases, a UE 115-a may, upon detection of a PDCCH with a configured DCI format 0_0, 0_1, or 0_2, transmit the corresponding PUSCH as indicated by the DCI. Upon detection of a DCI format 0_1 or 0_2 with the parameter UL-SCH indicator set to "0" and with a NZP CSI request where the associated parameter reportQuantity in the field CSI-ReportConfig is set to "none" for all CSI report(s) triggered by the parameter CSI request in the DCI format 0_1 or 0_2, the UE 115-a may ignore all fields in the DCI except the parameter CSI request and the UE 115-a may not transmit a corresponding PUSCH as indicated by the DCI format 0_1 or 0_2. When the UE 115-a is scheduled with multiple PUSCHs by a DCI, a HARQ process identifier (ID) indicated by the DCI may apply to the first PUSCH, and the HARQ process ID may be incremented by 1 for each subsequent PUSCH in the scheduled order, with modulo 16 operation applied. For any HARQ process ID in a given scheduled cell, the UE 115-a may not be expected to transmit a PUSCH that overlaps in time with another PUSCH. For any two HARQ process IDs in a given scheduled cell, if the UE 115-a is scheduled to start a first PUSCH transmission starting in symbol j by a PDCCH ending in symbol I, the UE 115-a may not be expected to be scheduled to transmit a PUSCH starting earlier than the end of the first PUSCH by a PDCCH that ends later than symbol i. The UE 115-a may not be expected to be scheduled to transmit another PUSCH by the DCI format 0_0, 0_1, or 0_2 scrambled by cell radio network temporary identifier (C-RNTI) or modulation and coding scheme (MCS) RNTI (MCS-RNTI) for a given HARQ process until after the end of the expected transmission of the last PUSCH for that HARQ process.

In wireless communications systems, energy consumption may be associated with a significant portion of the total operating budget. A significant percentage of the total energy consumption of wireless communications systems is attributable to RANs (e.g., approximately 50% of total energy consumption in 5G). 5G massive MIMO in particular is associated with high energy consumption. Various considerations may be accounted for when determining avenues to reduce energy consumption at the network side (e.g., at network entities 105 or base stations 140). For example, factors such as power added efficiency, the number of transmitting RUs 170, the base station load, sleep states and associated transition times, and reference parameters or considerations may be considered. Further, performance considerations (e.g., spectral efficiency, capacity, user perceived throughput, latency, handover performance, call drop rate, initial access performance, and service level agreement assurance and related key performance indicators) may be balanced and assessed in view of energy efficiency, UE power consumption, and network complexity. To reduce the impact on network performance, idle, low, and medium load scenarios at a network entity 105 may be opportunities for energy saving. Example scenarios include urban micro in frequency range 1 (FR1) including TDD massive MIMO (which scenario may also model small cells), frequency range 2 (FR2) beam based scenarios (which scenario may also model small cells), urban or rural macro in FR1 with or without dynamic spectrum sharing (DSS) (which may not impact LTE in the case of DSS), and Evolved-Universal Terrestrial Radio Access-New Radio Dual Connectivity (EN-DC) or NR Dual Connectivity (NR-DC) macro with FDD primary cell and TDD or massive MIMO on higher FR1 or FR2 frequency. In some cases, network energy saving techniques may not affect legacy UE performance.

To save energy, the network may adjust the transmission power of TRSs, for example depending of traffic or channel conditions. For example, to reduce energy usage, a network entity 105 may reduce the transmission power level of TRSs during low load conditions. An adjustment in the transmission power level for TRSs may impact measurements and AGC procedures at a UE 115 if the UE 115 is unaware of the transmission power level.

The network may signal to a UE 115 an adjustment to the transmission power level of TRSs. A UE 115 may receive control signaling (e.g., from a network entity 105) scheduling a set of multiple periodic TRSs and indicating a transmission power level for the periodic TRSs. For example, the control signaling may be received via RRC. The UE 115 may receive a DCI message (e.g., from the network entity 105) indicating an adjustment to the transmission power level and a resource for an aperiodic TRS. The UE 115 may monitor the resource for the aperiodic TRS in accordance with the indicated adjustment to the transmission power level. The UE 115 may transmit a message to the network entity 105 indicating a measurement of the aperiodic TRS based on the adjustment to the transmission power level. The adjustment to the transmission power level may apply to the one or more of the set of multiple periodic TRSs. For example, the adjustment to the transmission power level may apply for a set duration after the adjustment, or the adjustment to the transmission power level may apply to all periodic TRSs (e.g., until a subsequent adjustment). Accordingly, the scheduling DCI for an aperiodic TRS may indicate an adjustment to the transmission power level for a set of multiple periodic TRSs. In some cases, the DCI scheduling the aperiodic TRS may include a defined field indicating the adjustment to the transmission power level. In some cases, the FDRA of the DCI scheduling the aperiodic TRS may include a defined value to indicate the adjustment to the transmission power level.

Figure 2:
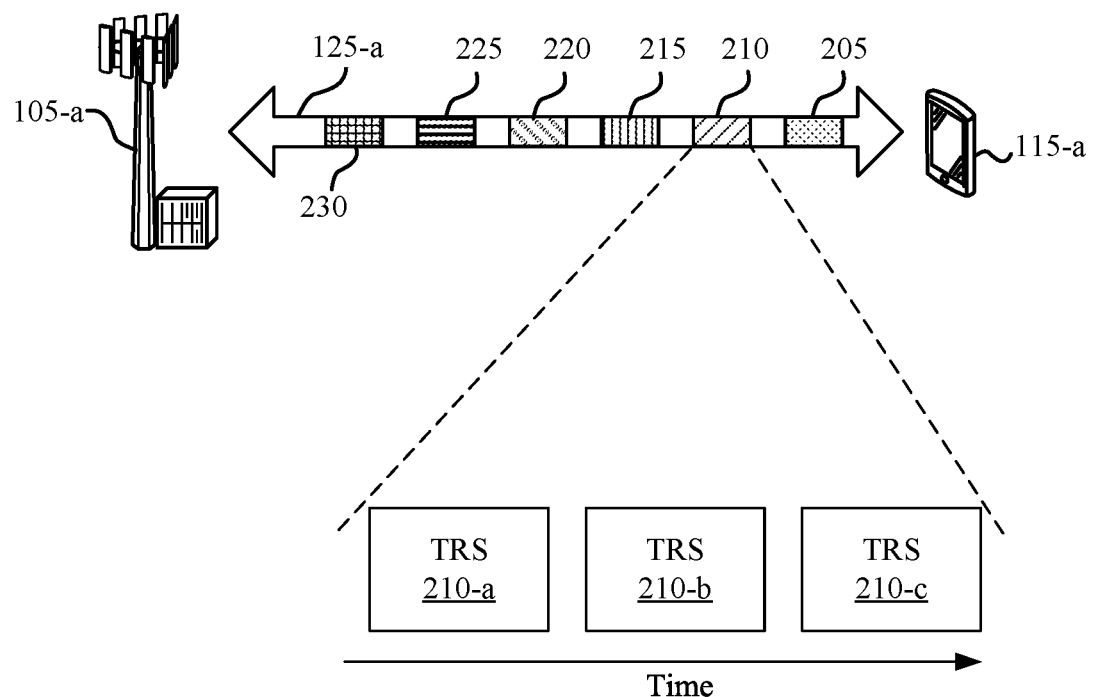
FIG. 2 illustrates an example of a wireless communications system that supports aperiodic TRS triggering mechanism to update TRS power in accordance with one or more aspects of the present disclosure.

FIG. 2 illustrates an example of a wireless communications system 200 that supports aperiodic TRS triggering mechanism to update TRS power in accordance with one or more aspects of the present disclosure. In some examples, the wireless communications system 200 may implement aspects of wireless communications system 100. The wireless communications system 200 may include a UE 115-*a*, which may be an example of a UE 115 as described herein. The wireless communications system 200 may include a network entity 105-*a*, which may be an example of a network entity 105 as described herein.

The UE 115-*a* may communicate with the network entity 105-*a* using a communication link 125-*a*, which may be examples of NR or LTE links between the UE 115-*a* and the network entity 105-*a*. The communication link 125-*a* may include a bi-directional link that enables both uplink and downlink communication. For example, the UE 115-*a* may transmit uplink signals, such as uplink control signals or uplink data signals, to the network entity 105-*a* using the communication link 125-*a* and the network entity 105-*a* may transmit downlink transmissions, such as downlink control signals or downlink data signals, to the UE 115-*a* using the communication link 125-*a*.

The network entity 105-*a* may transmit periodic TRSs 210 (e.g., TRS 210-*a*, TRS 210-*b*, and TRS 210-*c*) to the UE 115-*a*, which the UE 115-*a* may use to estimate channel characteristics. For example, the UE 115-*a* may report measurements of TRSs to the network for channel estimation or the UE 115-*a* may utilize one or more TRSs to perform an AGC procedure. The network entity 105-*a* may transmit control signaling 205 indicating scheduling information for the periodic TRSs 210. For example, the control signaling 205 may be transmitted via RRC. The control signaling 205 may indicate a transmission power level for the set of periodic TRSs 210. An AGC setting may be based on a synchronization signal block (SSB) or a TRS. Changes in transmission power level may affect the AGC procedure at the UE 115-*a* (e.g., an absolute power change of more than 6 decibels may detrimentally affect the AGC procedure). Accordingly, changes in periodic TRS transmission power level may be indicated to the UE 115-*a* via triggering an aperiodic TRS 225 to enable UE 115-*a* to properly set its AGC for monitoring the TRS.

The network entity 105-*a* may trigger an aperiodic TRS 225 via a DCI message 220. In some cases, the DCI message 220 may convey an uplink grant without a PUSCH transmission. In some cases, the DCI message 220 may be a DCI format 0_1 or 0_2. In some cases, the DCI message 220 may include an indication of an adjustment to the transmission power level for the periodic TRSs 210. In some cases, the indication of an adjustment to the transmission power level may be a new field in the DCI format 0_1 or 0_2 (e.g., where the uplink shared channel indicator parameter is set to "1", indicating that the DCI message 220 is carrying an uplink grant). In some cases, if the DCI message 220 does not schedule a PUSCH transmission (e.g., where the uplink shared channel indicator parameter is set to "0" indicating that the DCI message 220 is not carrying an uplink grant), the FDRA of the DCI message 220 may be set to a defined value to indicate that a field of the DCI message 220 indicates an adjustment to the transmission power level. For example, the FDRA may be set to all "1s" for type 1 resource allocation or all "0s" for type 0 resource allocation, and then an existing field in the DCI message 220 may be interpreted as indicating the adjustment to the transmission power level (e.g., the field for MCS, transmit power control command, new data indicator, redundancy version, antenna port number). For example, all fields in the DCI message 220 except the defined field may be set to "0" or to "1". In some examples, the DCI message 220 may indicate the adjustment to the transmission power level and a resource allocated for an aperiodic TRS 225.

The UE 115-*a* may monitor the indicated resource for the aperiodic TRS 225 in accordance with the DCI message 220. The UE 115-*a* may measure the aperiodic TRS 225 based on the adjustment to the transmission power level and transmit a report 230 to the network entity 105-*a* indicating the measurement of the aperiodic TRS 225.

In some cases, the network entity 105-*a* may transmit second control signaling 215 indicating a CSI reporting configuration. In some cases, the second control signaling 215 may be transmitted via RRC. In some cases, the second control signaling 215 may be transmitted in the same message as the control signaling 205. The second control signaling 215 may indicate or contain multiple aperiodic CSI trigger states corresponding to different TRS transmission power levels. The DCI message 220 may indicate the TRS transmission power level from the different TRS transmission power levels corresponding to the CSI trigger states. In some cases, the report 230 may include a CSI report generated at the UE 115-*a* in accordance with the CSI reporting configuration indicated in the second control signaling 215.

In some cases, the adjustment to the transmission power level may be applied to all subsequent periodic TRSs 210. For example, if the aperiodic TRS 225 is transmitted after the periodic TRS 210-*a* but before the periodic TRS 210-*b*, the adjustment to the transmission power level may be applied to the periodic TRS 210-*b* and the periodic TRS 210-*c*. In some cases, the control signaling 205 or the DCI message 220 may indicate that an adjustment to the transmission power level may be applied to all subsequent periodic TRSs 210. The UE 115-*a* may perform channel estimation and/or AGC using the subsequent periodic TRSs 210 based on the adjustment to the transmission power level.

In some cases, the adjustment to the transmission power level may be applied to all subsequent periodic TRSs within a defined time or duration after the aperiodic TRS 225. For example, the control signaling 205 or the DCI message 220 may indicate a timer or a duration which is applicable for an adjustment to the transmission power level of TRSs. The UE 115-*a* may perform channel estimation and/or AGC using the subsequent periodic TRSs 210 based on the adjustment to the transmission power level.

In some cases, the adjustment to the transmission power level may be indicated as an absolute power adjustment or may be indicated as an offset to a reference transmission power level. For example, the DCI message 220 may indicate the adjustment to the transmission power level as an offset relative to a reference transmission power level or as an offset relative to the configured transmission power level of at least one of the periodic TRSs 210 (e.g., which may have been previously measured and reported by the UE 115-*a* or configured in the control signaling 205).

Figure 3:
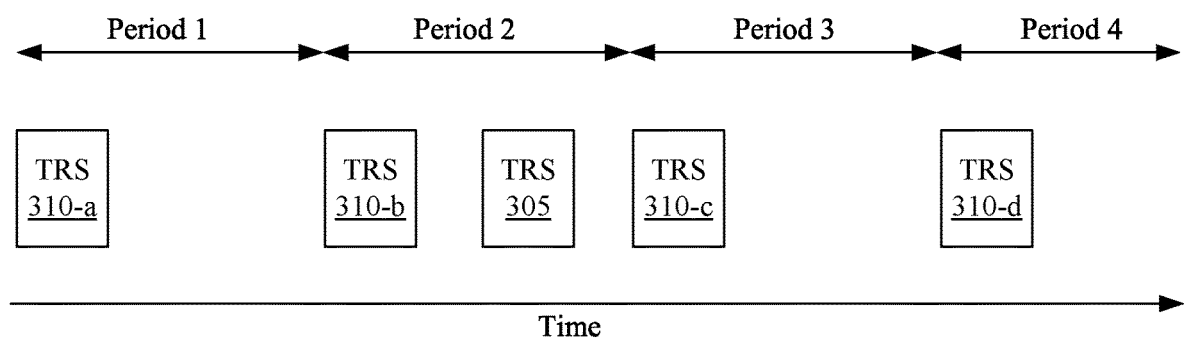
FIG. 3 illustrates an example of a timing diagram that supports aperiodic TRS triggering mechanism to update TRS power in accordance with one or more aspects of the present disclosure.

FIG. 3 illustrates an example of a timing diagram 300 that supports aperiodic TRS triggering mechanism to update TRS power in accordance with one or more aspects of the present disclosure. In some examples, the timing diagram 300 may implement aspects of wireless communications systems 100 or 200.

As described herein, a UE 115 may receive control signaling scheduling a set of multiple periodic TRSs 310 (e.g., periodic TRS 310-*a*, periodic TRS 310-*b*, periodic TRS 310-*c*, and periodic TRS 310-*d*. The control signaling may indicate a transmission power level for one or more of the periodic TRSs 310. The UE 115 may receive a DCI message indicating a resource for an aperiodic TRS 305 and an adjustment to the TRS transmission power level. The UE 115 may monitor the indicated resource for the aperiodic TRS, and measure and report the measurement of the aperiodic TRS 305 to a network entity 105 based on the adjustment to the TRS transmission power level.

In some cases, the adjustment to the transmission power level may be applied to all subsequent periodic TRSs 310. For example, if the aperiodic TRS 305 is transmitted after the periodic TRS 310-*b* but before the periodic TRS 310-*c*, the adjustment to the transmission power level may be applied to the TRS 310-*c* and the TRS 310-*d*. In some cases, the control signaling or the DCI message scheduling the aperiodic TRS 305 may indicate that an adjustment to the transmission power level may be applied to all subsequent periodic TRSs 310. The UE 115 may perform channel estimation and/or AGC using the subsequent periodic TRSs 310 based on the adjustment to the transmission power level.

In some cases, the adjustment to the transmission power level may be applied to all subsequent periodic TRSs within a defined time or duration after the aperiodic TRS 305. For example, the control signaling or the DCI message scheduling the aperiodic TRS 305 may indicate a timer or a duration which is applicable for an adjustment to the transmission power level of TRSs. For example, the duration may include one periodic TRS 310 (e.g., the adjustment to the transmission power level may apply to the TRS 310-*c* but not the TRS 310-*d*). The UE 115 may perform channel estimation and/or AGC using the subsequent periodic TRSs 310 based on the adjustment to the transmission power level. Before the defined time or duration expires, the network entity 105 signal a transmission power level of one or more subsequent TRSs or the UE 115 may assume that the transmission power level reverts to the transmission power level configured for the periodic TRSs prior to receiving the aperiodic TRS.

Figure 4:
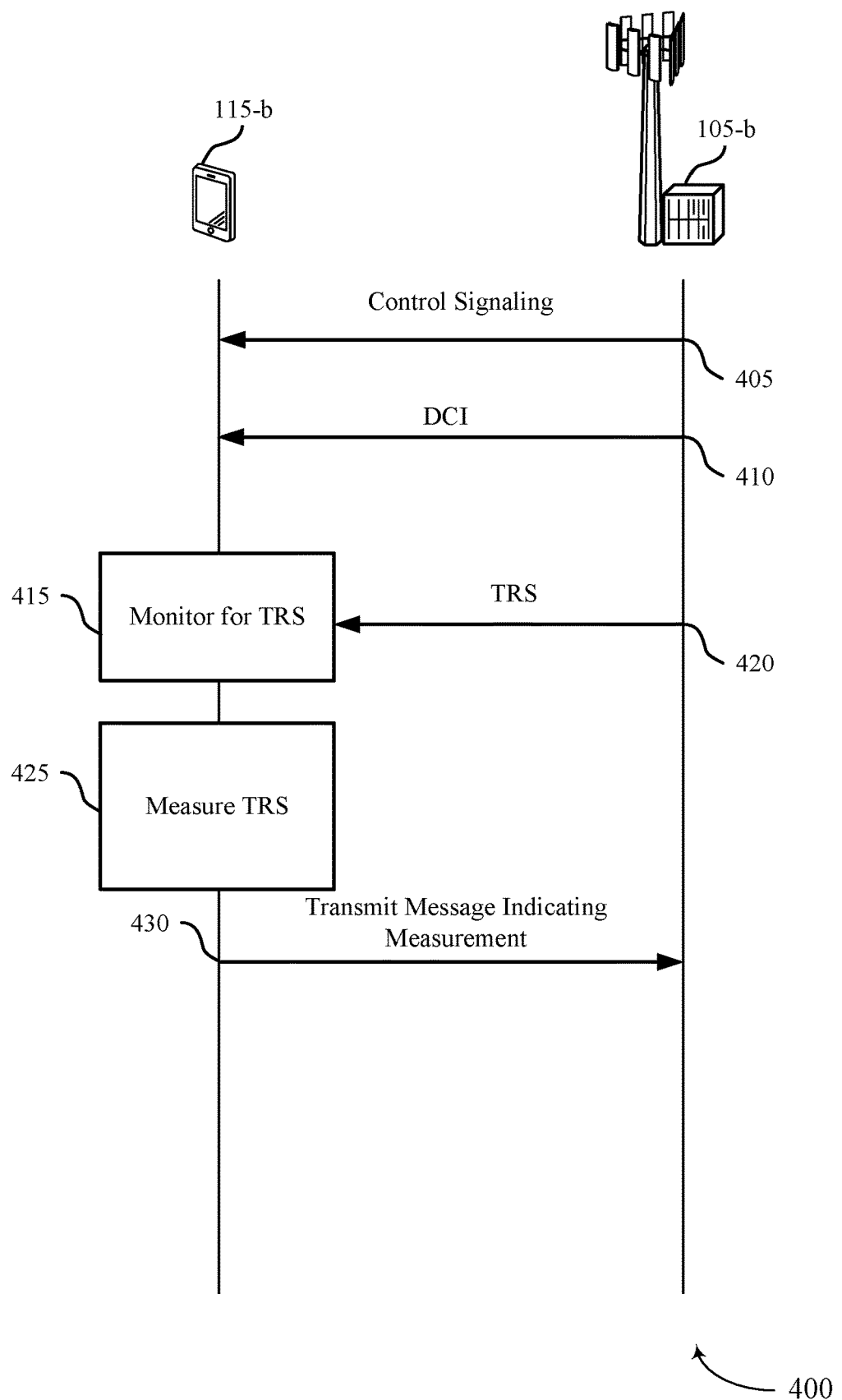
FIG. 4 illustrates an example of a process flow that supports aperiodic TRS triggering mechanism to update TRS power in accordance with one or more aspects of the present disclosure.

FIG. 4 illustrates an example of a process flow 400 that supports aperiodic TRS triggering mechanism to update TRS power in accordance with one or more aspects of the present disclosure. The process flow 400 may include a UE 115-*b*, which may be an example of a UE 115 as described herein. The process flow 400 may include a network entity 105-*b*, which may be an example of a network entity 105 as described herein. In the following description of the process flow 400, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 400, and other operations may be added to the process flow 400.

At 405, the UE 115-*b* may receive, from the network entity 105-*b*, control signaling scheduling a set of multiple periodic TRSs and indicating a transmission power level for at least one of the set of multiple of periodic TRSs.

At 410, the UE 115-*b* may receive, from the network entity 105-*b*, DCI message indicating an adjustment to the transmission power level and a resource allocated for an aperiodic TRS. In some cases, the DCI message may include an uplink grant for the UE 115-*b* and a TRS transmission power level adjustment field. In some cases, the DCI message may include a FDRA set to a defined value to indicate that a field of the DCI indicates the adjustment to the transmission power level.

At 415, the UE 115-*b* may monitor resource for the aperiodic TRS in accordance with the DCI message.

At 420, the network entity 105-*b* may transmit the aperiodic TRS using the resource in accordance with the DCI message transmitted at 410.

At 425, the UE 115-*b* may perform a measurement on the aperiodic TRS transmitted at 420 based on the monitoring at 415 and the adjustment to the transmission power level.

At 430, the UE 115-*b* may transmit, to the network entity 105-*b*, a message indicating the measurement of the aperiodic TRS in the resource based on the adjustment to the transmission power level.

In some cases, the network entity 105-*b* may transmit, to the UE 115-*b*, second control signaling indicating a CSI reporting configuration comprising a set of multiple trigger states corresponding to a respective set of multiple TRS transmission power levels, and the DCI message at 410 may indicate a trigger state of the set of multiple trigger states. In some cases, the UE 115-*b* may generate a CSI report in accordance with the CSI reporting configuration and based on the adjustment to the transmission power level, and the message at 430 indicating the measurement of the aperiodic TRS may include the CSI report.

In some cases, the control signaling at 405 may include an indication of a duration for transmission power level adjustment, where the adjustment to the transmission power level applies to one or more periodic TRSs of the set of multiple periodic TRSs scheduled for transmission within the duration after the DCI message at 410. For example, the network entity 105-*b* may transmit periodic TRSs during the duration after the DCI message at 410 using the same power level as the aperiodic TRS transmitted at 420.

In some cases, the control signaling at 405 may include an indication that power level adjustments apply to one or more periodic TRSs of the set of multiple periodic TRSs scheduled for transmission after a future adjustment to the transmission power level. For example, the network entity 105-*b* may transmit periodic TRSs after the DCI message at 410 using the same power level as the aperiodic TRS transmitted at 420.

In some cases, the DCI message at 410 may include an indication of a duration for transmission power level adjustment, where the adjustment to the transmission power level applies to one or more periodic TRSs of the set of multiple periodic TRSs scheduled for transmission within the duration after the DCI message at 410. For example, the network entity 105-*b* may transmit periodic TRSs during the duration after the DCI message at 410 using the same power level as the aperiodic TRS transmitted at 420.

In some cases, the DCI message at 410 may include an indication that power level adjustments apply to one or more periodic TRSs of the set of multiple periodic TRSs scheduled for transmission after a future adjustment to the transmission power level. For example, the network entity 105-*b* may transmit periodic TRSs after the DCI message at 410 using the same power level as the aperiodic TRS transmitted at 420.

In some cases, the DCI message at 410 may indicate the adjustment to the transmission power level as an offset relative to a reference transmission power level.

In some cases, the DCI message at 410 may indicate the adjustment to the transmission power level as an offset relative to the transmission power level of the at least one of the set of multiple periodic TRSs.

In some cases, the UE 115-*b* may perform a set of AGC procedures based on the set of multiple periodic TRSs and in accordance with the adjustment to the transmission power level.

Figure 5:
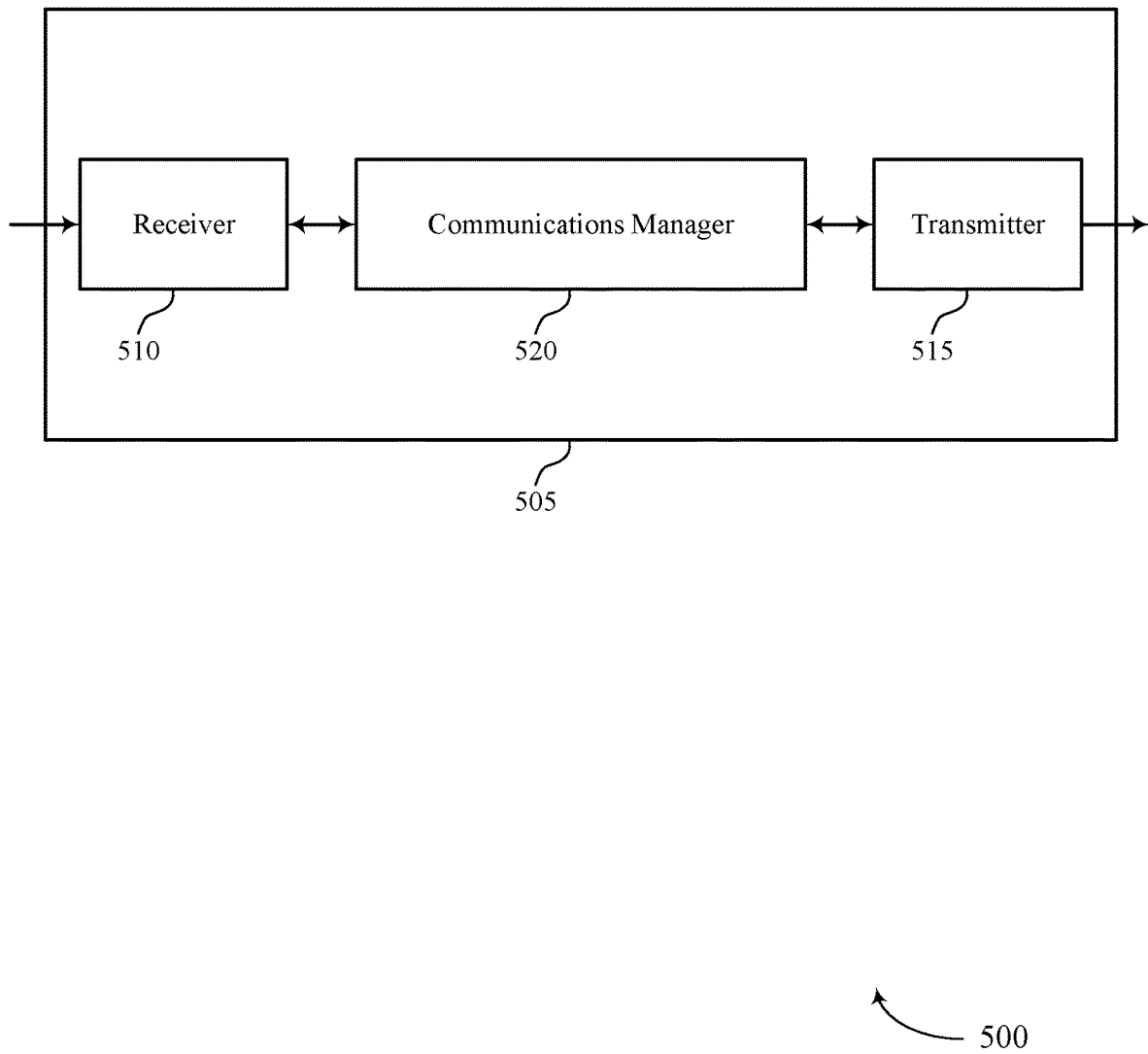
FIGS. 5 and 6 show block diagrams of devices that support aperiodic TRS triggering mechanism to update TRS power in accordance with one or more aspects of the present disclosure.

FIG. 5 shows a block diagram 500 of a device 505 that supports aperiodic TRS triggering mechanism to update TRS power in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to aperiodic TRS triggering mechanism to update TRS power). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to aperiodic TRS triggering mechanism to update TRS power). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of aperiodic TRS triggering mechanism to update TRS power as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving, from a network entity, control signaling scheduling a set of multiple periodic TRSs and indicating a transmission power level for at least one of the set of multiple periodic TRSs. The communications manager 520 may be configured as or otherwise support a means for receiving, from the network entity, a DCI message indicating an adjustment to the transmission power level and a resource allocated for an aperiodic TRS. The communications manager 520 may be configured as or otherwise support a means for monitoring the resource for the aperiodic TRS in accordance with the DCI message. The communications manager 520 may be configured as or otherwise support a means for transmitting, to the network entity, a message indicating a measurement of the aperiodic TRS in the resource based on the adjustment to the transmission power level.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption and more efficient utilization of communication resources by enabling signaling of transmission power level adjustments for TRSs.

Figure 6:
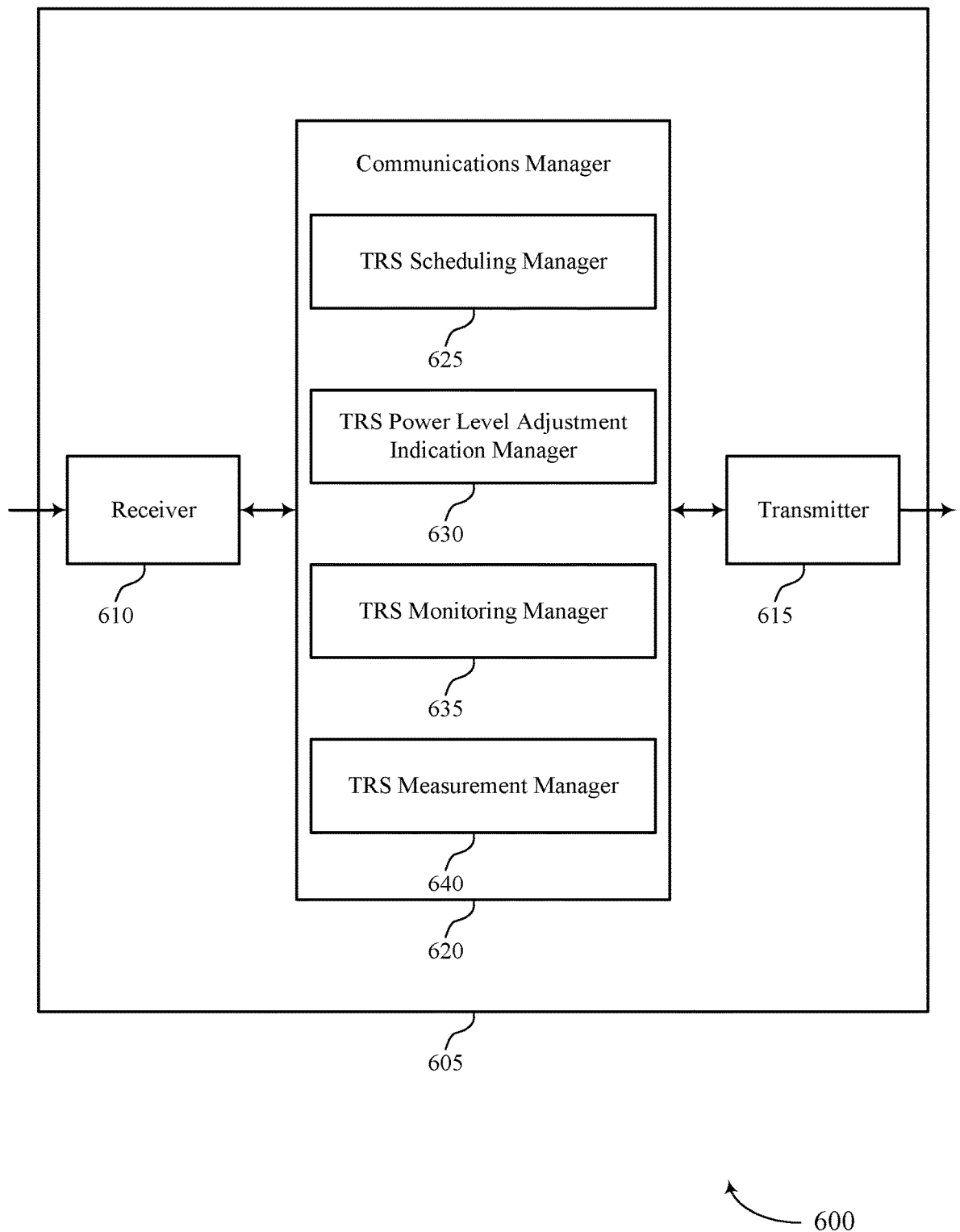

FIG. 6 shows a block diagram 600 of a device 605 that supports aperiodic TRS triggering mechanism to update TRS power in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to aperiodic TRS triggering mechanism to update TRS power). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to aperiodic TRS triggering mechanism to update TRS power). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of aperiodic TRS triggering mechanism to update TRS power as described herein. For example, the communications manager 620 may include an TRS scheduling manager 625, an TRS power level adjustment indication manager 630, an TRS monitoring manager 635, an TRS measurement manager 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The TRS scheduling manager 625 may be configured as or otherwise support a means for receiving, from a network entity, control signaling scheduling a set of multiple periodic TRSs and indicating a transmission power level for at least one of the set of multiple periodic TRSs. The TRS power level adjustment indication manager 630 may be configured as or otherwise support a means for receiving, from the network entity, a DCI message indicating an adjustment to the transmission power level and a resource allocated for an aperiodic TRS. The TRS monitoring manager 635 may be configured as or otherwise support a means for monitoring the resource for the aperiodic TRS in accordance with the DCI message. The TRS measurement manager 640 may be configured as or otherwise support a means for transmitting, to the network entity, a message indicating a measurement of the aperiodic TRS in the resource based on the adjustment to the transmission power level.

Figure 7:
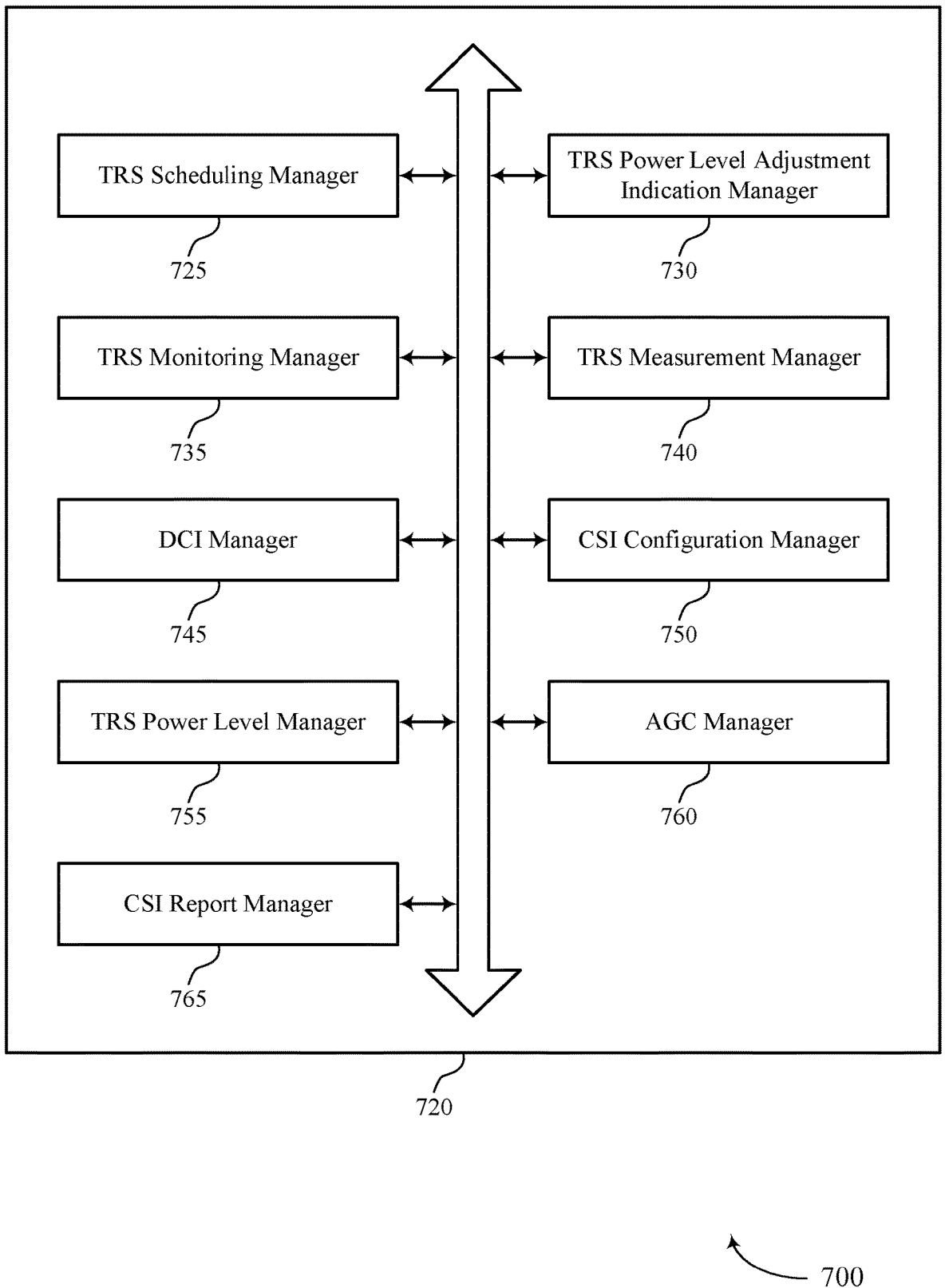
FIG. 7 shows a block diagram of a communications manager that supports aperiodic TRS triggering mechanism to update TRS power in accordance with one or more aspects of the present disclosure.

FIG. 7 shows a block diagram 700 of a communications manager 720 that supports aperiodic TRS triggering mechanism to update TRS power in accordance with one or more aspects of the present disclosure. The communications manager 720 may be an example of aspects of a communications manager 520, a communications manager 620, or both, as described herein. The communications manager 720, or various components thereof, may be an example of means for performing various aspects of aperiodic TRS triggering mechanism to update TRS power as described herein. For example, the communications manager 720 may include an TRS scheduling manager 725, an TRS power level adjustment indication manager 730, an TRS monitoring manager 735, an TRS measurement manager 740, a DCI manager 745, a CSI configuration manager 750, an TRS power level manager 755, an AGC manager 760, a CSI report manager 765, or any combination thereof. Each of these components may communicate, directly or indirectly, with one another (e.g., via one or more buses).

The communications manager 720 may support wireless communications at a UE in accordance with examples as disclosed herein. The TRS scheduling manager 725 may be configured as or otherwise support a means for receiving, from a network entity, control signaling scheduling a set of multiple periodic TRSs and indicating a transmission power level for at least one of the set of multiple periodic TRSs. The TRS power level adjustment indication manager 730 may be configured as or otherwise support a means for receiving, from the network entity, a DCI message indicating an adjustment to the transmission power level and a resource allocated for an aperiodic TRS. The TRS monitoring manager 735 may be configured as or otherwise support a means for monitoring the resource for the aperiodic TRS in accordance with the DCI message. The TRS measurement manager 740 may be configured as or otherwise support a means for transmitting, to the network entity, a message indicating a measurement of the aperiodic TRS in the resource based on the adjustment to the transmission power level.

In some examples, to support receiving the DCI message indicating the adjustment to the transmission power level, the DCI manager 745 may be configured as or otherwise support a means for receiving the DCI message including an uplink grant for the UE and a TRS transmission power level adjustment field.

In some examples, to support receiving the DCI message indicating the adjustment to the transmission power level, the DCI manager 745 may be configured as or otherwise support a means for receiving the DCI message including a frequency domain resource allocation set to a defined value to indicate that a field of the DCI message indicates the adjustment to the transmission power level.

In some examples, the CSI configuration manager 750 may be configured as or otherwise support a means for receiving second control signaling indicating a CSI reporting configuration including a set of multiple trigger states corresponding to a respective set of multiple TRS transmission power levels, and where the DCI message indicates a trigger state of the set of multiple trigger states.

In some examples, the CSI report manager 765 may be configured as or otherwise support a means for generating a CSI report in accordance with the CSI reporting configuration and based on the adjustment to the transmission power level, where the message indicating the measurement of the aperiodic TRS includes the CSI report.

In some examples, the TRS power level manager 755 may be configured as or otherwise support a means for receiving, with the control signaling, an indication of a duration for transmission power level adjustment, where the adjustment to the transmission power level applies to one or more periodic TRSs of the set of multiple periodic TRSs scheduled for transmission within the duration after the DCI message indicating the adjustment to the transmission power level.

In some examples, the TRS power level manager 755 may be configured as or otherwise support a means for receiving, with the control signaling, an indication that power level adjustments apply to one or more periodic TRSs of the set of multiple periodic TRSs scheduled for transmission after a future adjustment to the transmission power level.

In some examples, the TRS power level manager 755 may be configured as or otherwise support a means for receiving, with the DCI message, an indication of a duration for transmission power level adjustment, where the adjustment to the transmission power level applies to one or more periodic TRSs of the set of multiple periodic TRSs scheduled for transmission within the duration after the DCI message indicating the adjustment to the transmission power level.

In some examples, the TRS power level manager 755 may be configured as or otherwise support a means for receiving, with the DCI message, an indication that power level adjustments apply to one or more periodic TRSs of the set of multiple periodic TRSs scheduled for transmission after a future adjustment to the transmission power level.

In some examples, the AGC manager 760 may be configured as or otherwise support a means for performing a set of automatic gain control procedures based on the set of multiple periodic TRSs and in accordance with the adjustment to the transmission power level.

In some examples, the DCI message indicates the adjustment to the transmission power level as an offset relative to a reference transmission power level.

In some examples, the DCI message indicates the adjustment to the transmission power level as an offset relative to the transmission power level of the at least one of the set of multiple periodic TRSs.

Figure 8:
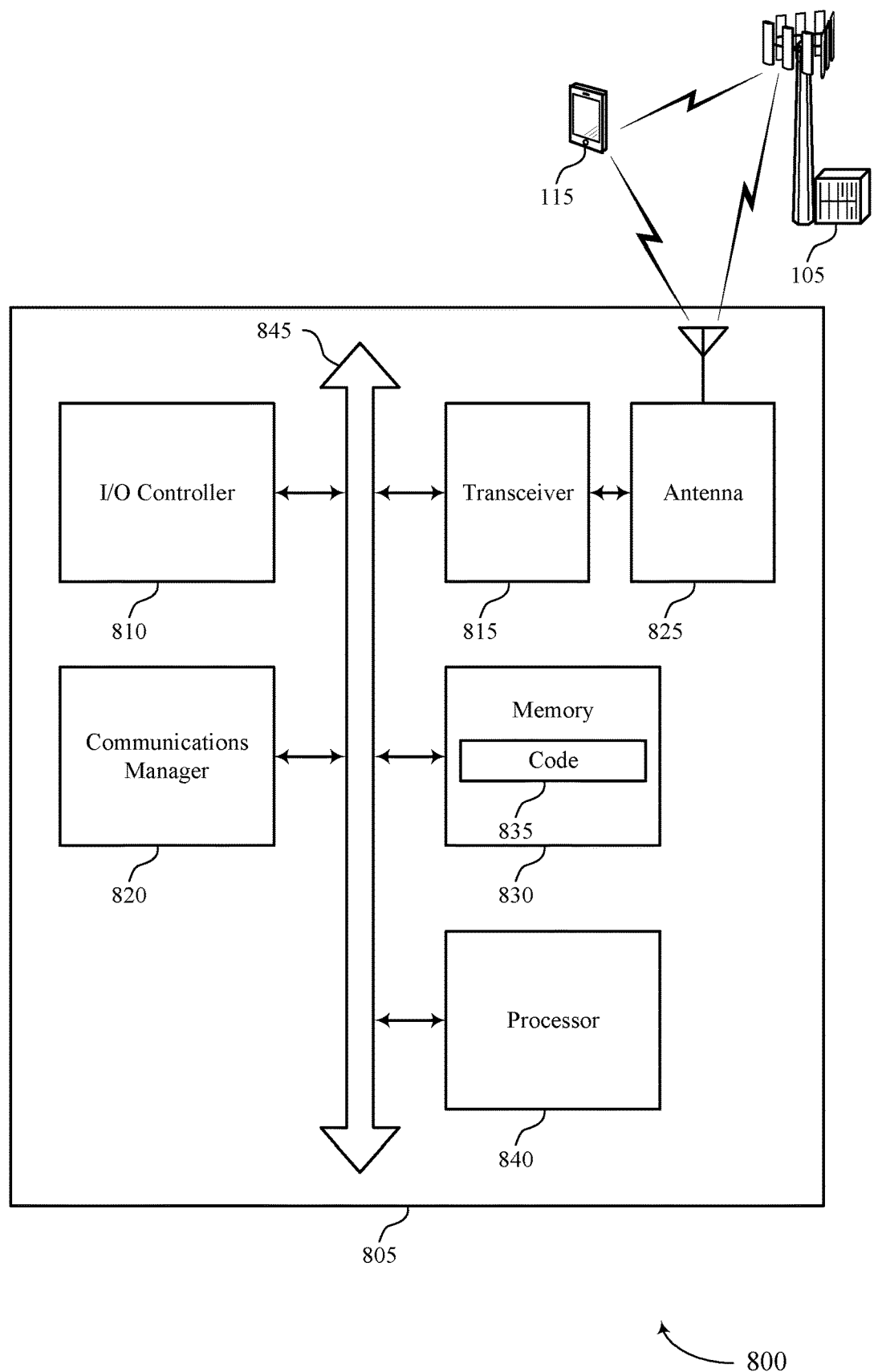
FIG. 8 shows a diagram of a system including a device that supports aperiodic TRS triggering mechanism to update TRS power in accordance with one or more aspects of the present disclosure.

FIG. 8 shows a diagram of a system 800 including a device 805 that supports aperiodic TRS triggering mechanism to update TRS power in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting aperiodic TRS triggering mechanism to update TRS power). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a network entity, control signaling scheduling a set of multiple periodic TRSs and indicating a transmission power level for at least one of the set of multiple periodic TRSs. The communications manager 820 may be configured as or otherwise support a means for receiving, from the network entity, a DCI message indicating an adjustment to the transmission power level and a resource allocated for an aperiodic TRS. The communications manager 820 may be configured as or otherwise support a means for monitoring the resource for the aperiodic TRS in accordance with the DCI message. The communications manager 820 may be configured as or otherwise support a means for transmitting, to the network entity, a message indicating a measurement of the aperiodic TRS in the resource based on the adjustment to the transmission power level.

By including or configuring the communications manager 820 in accordance with examples as described herein, the device 805 may support techniques for reduced power consumption, more efficient utilization of communication resources, and improved coordination between devices by enabling signaling of transmission power level adjustments for TRSs.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of aperiodic TRS triggering mechanism to update TRS power as described herein, or the processor 840 and the memory 830 may be otherwise configured to perform or support such operations.

Figure 9:
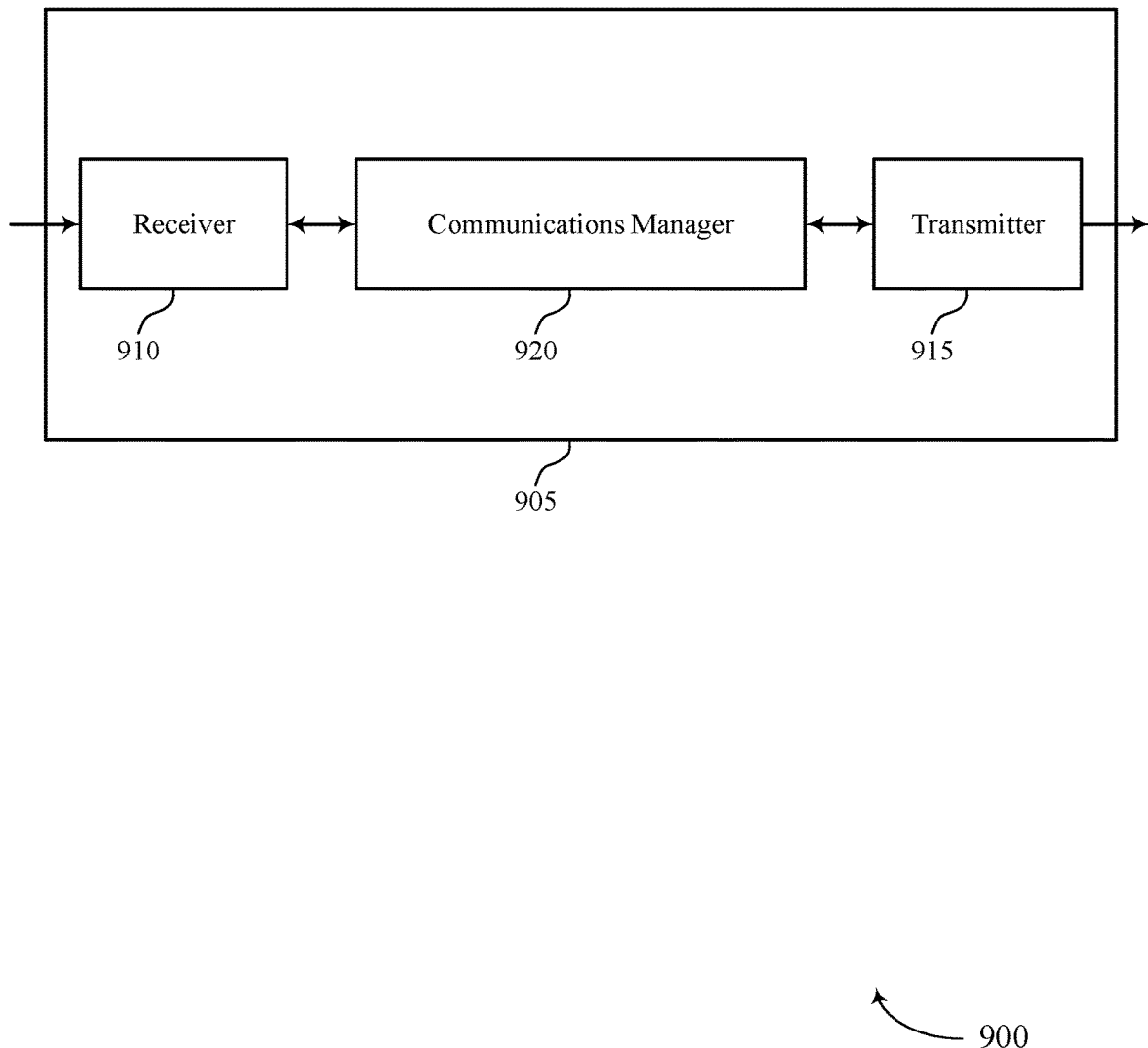
FIGS. 9 and 10 show block diagrams of devices that support aperiodic TRS triggering mechanism to update TRS power in accordance with one or more aspects of the present disclosure.

FIG. 9 shows a block diagram 900 of a device 905 that supports aperiodic TRS triggering mechanism to update TRS power in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of aperiodic TRS triggering mechanism to update TRS power as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting, to a UE, control signaling scheduling a set of multiple periodic TRSs and indicating a transmission power level for at least one of the set of multiple periodic TRSs. The communications manager 920 may be configured as or otherwise support a means for transmitting, to the UE, a DCI message indicating an adjustment to the transmission power level and a resource allocated for an aperiodic TRS. The communications manager 920 may be configured as or otherwise support a means for transmitting the aperiodic TRS using the resource in accordance with the DCI message. The communications manager 920 may be configured as or otherwise support a means for receiving, from the UE, a message indicating a measurement of the aperiodic TRS in the resource based on the adjustment to the transmission power level.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption and more efficient utilization of communication resources by enabling signaling of transmission power level adjustments for TRSs.

Figure 10:
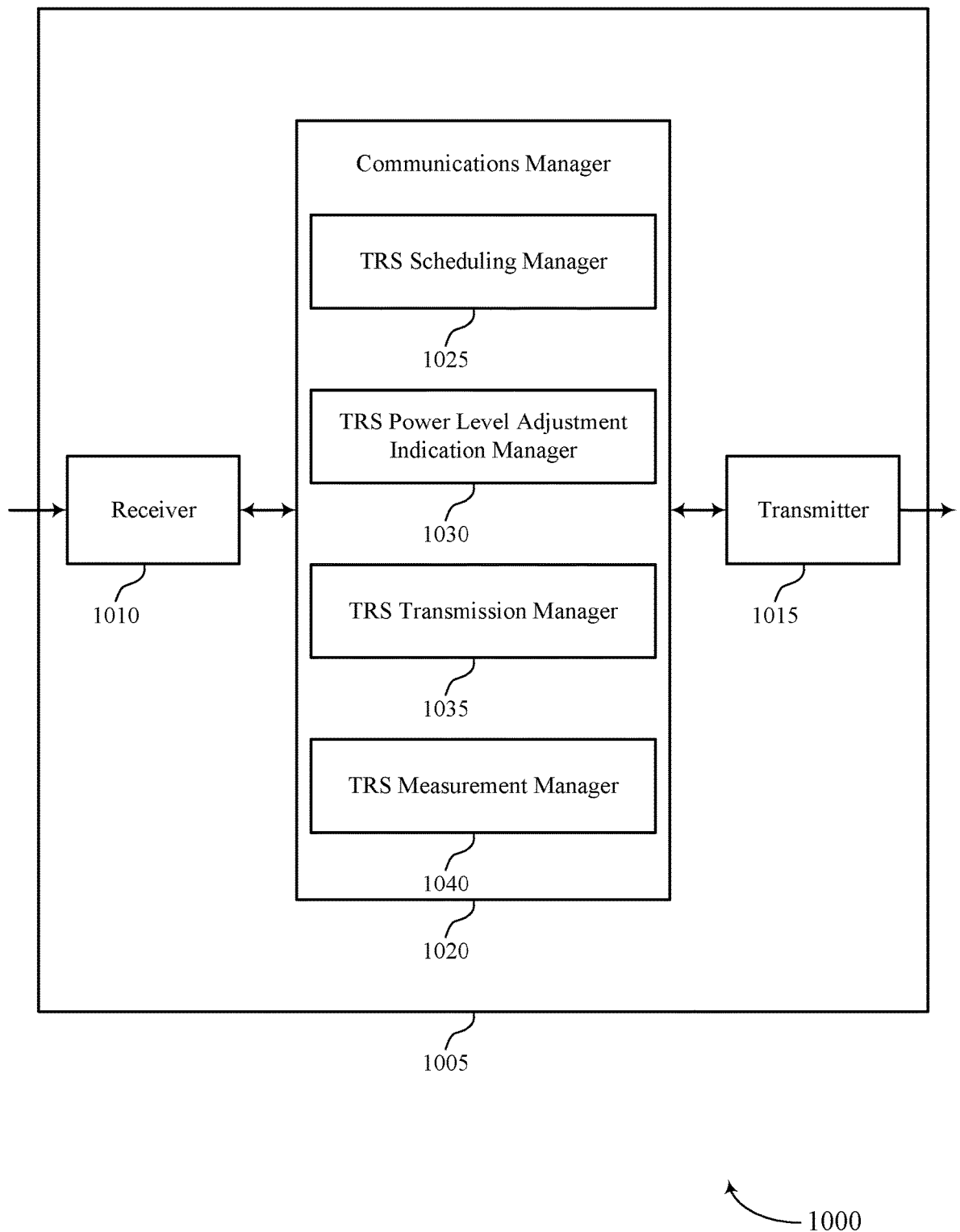

FIG. 10 shows a block diagram 1000 of a device 1005 that supports aperiodic TRS triggering mechanism to update TRS power in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of aperiodic TRS triggering mechanism to update TRS power as described herein. For example, the communications manager 1020 may include an TRS scheduling manager 1025, an TRS power level adjustment indication manager 1030, an TRS transmission manager 1035, an TRS measurement manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The TRS scheduling manager 1025 may be configured as or otherwise support a means for transmitting, to a UE, control signaling scheduling a set of multiple periodic TRSs and indicating a transmission power level for at least one of the set of multiple periodic TRSs. The TRS power level adjustment indication manager 1030 may be configured as or otherwise support a means for transmitting, to the UE, a DCI message indicating an adjustment to the transmission power level and a resource allocated for an aperiodic TRS. The TRS transmission manager 1035 may be configured as or otherwise support a means for transmitting the aperiodic TRS using the resource in accordance with the DCI message. The TRS measurement manager 1040 may be configured as or otherwise support a means for receiving, from the UE, a message indicating a measurement of the aperiodic TRS in the resource based on the adjustment to the transmission power level.

Figure 11:
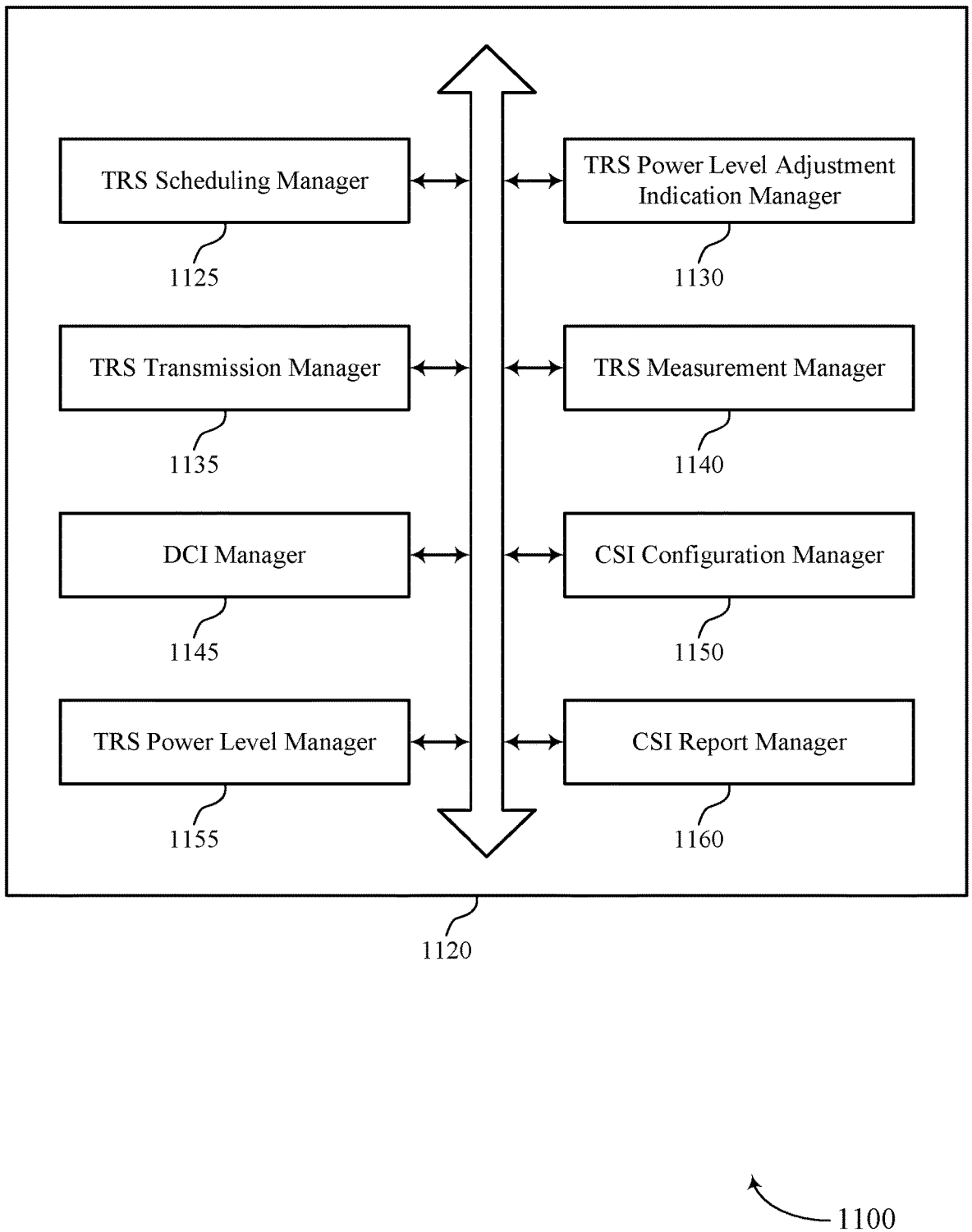
FIG. 11 shows a block diagram of a communications manager that supports aperiodic TRS triggering mechanism to update TRS power in accordance with one or more aspects of the present disclosure.

FIG. 11 shows a block diagram 1100 of a communications manager 1120 that supports aperiodic TRS triggering mechanism to update TRS power in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of aperiodic TRS triggering mechanism to update TRS power as described herein. For example, the communications manager 1120 may include an TRS scheduling manager 1125, an TRS power level adjustment indication manager 1130, an TRS transmission manager 1135, an TRS measurement manager 1140, a DCI manager 1145, a CSI configuration manager 1150, an TRS power level manager 1155, a CSI report manager 1160, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The TRS scheduling manager 1125 may be configured as or otherwise support a means for transmitting, to a UE, control signaling scheduling a set of multiple periodic TRSs and indicating a transmission power level for at least one of the set of multiple periodic TRSs. The TRS power level adjustment indication manager 1130 may be configured as or otherwise support a means for transmitting, to the UE, a DCI message indicating an adjustment to the transmission power level and a resource allocated for an aperiodic TRS. The TRS transmission manager 1135 may be configured as or otherwise support a means for transmitting the aperiodic TRS using the resource in accordance with the DCI message. The TRS measurement manager 1140 may be configured as or otherwise support a means for receiving, from the UE, a message indicating a measurement of the aperiodic TRS in the resource based on the adjustment to the transmission power level.

In some examples, to support transmitting the DCI message indicating the adjustment to the transmission power level, the DCI manager 1145 may be configured as or otherwise support a means for transmitting the DCI message including an uplink grant for the UE and a TRS transmission power level adjustment field.

In some examples, to support transmitting the DCI message indicating the adjustment to the transmission power level, the DCI manager 1145 may be configured as or otherwise support a means for transmitting the DCI message including a frequency domain resource allocation set to a defined value to indicate that a field of the DCI message indicates the adjustment to the transmission power level.

In some examples, the CSI configuration manager 1150 may be configured as or otherwise support a means for transmitting second control signaling indicating a CSI reporting configuration including a set of multiple trigger states corresponding to a respective set of multiple TRS transmission power levels, and where the DCI message indicates a trigger state of the set of multiple trigger states.

In some examples, to support receiving the message indicating the measurement of the aperiodic TRS in the resource, the CSI report manager 1160 may be configured as or otherwise support a means for receiving a CSI report in accordance with the CSI reporting configuration and based on the adjustment to the transmission power level.

In some examples, the TRS power level manager 1155 may be configured as or otherwise support a means for transmitting, with the control signaling, an indication of a duration for transmission power level adjustment, where the adjustment to the transmission power level applies to one or more periodic TRSs of the set of multiple periodic TRSs scheduled for transmission within the duration after the DCI message indicating the adjustment to the transmission power level.

In some examples, the TRS power level manager 1155 may be configured as or otherwise support a means for transmitting, with the control signaling, an indication that power level adjustments apply to one or more periodic TRSs of the set of multiple periodic TRSs scheduled for transmission after a future adjustment to the transmission power level.

In some examples, the TRS power level manager 1155 may be configured as or otherwise support a means for transmitting, with the DCI message, an indication of a duration for transmission power level adjustment, where the adjustment to the transmission power level applies to one or more periodic TRSs of the set of multiple periodic TRSs scheduled for transmission within the duration after the DCI message indicating the adjustment to the transmission power level.

In some examples, the TRS power level manager 1155 may be configured as or otherwise support a means for transmitting, with the DCI message, an indication that power level adjustments apply to one or more periodic TRSs of the set of multiple periodic TRSs scheduled for transmission after a future adjustment to the transmission power level.

In some examples, the DCI message indicates the adjustment to the transmission power level as an offset relative to a reference transmission power level.

In some examples, the DCI message indicates the adjustment to the transmission power level as an offset relative to the transmission power level of the at least one of the set of multiple periodic TRSs.

Figure 12:
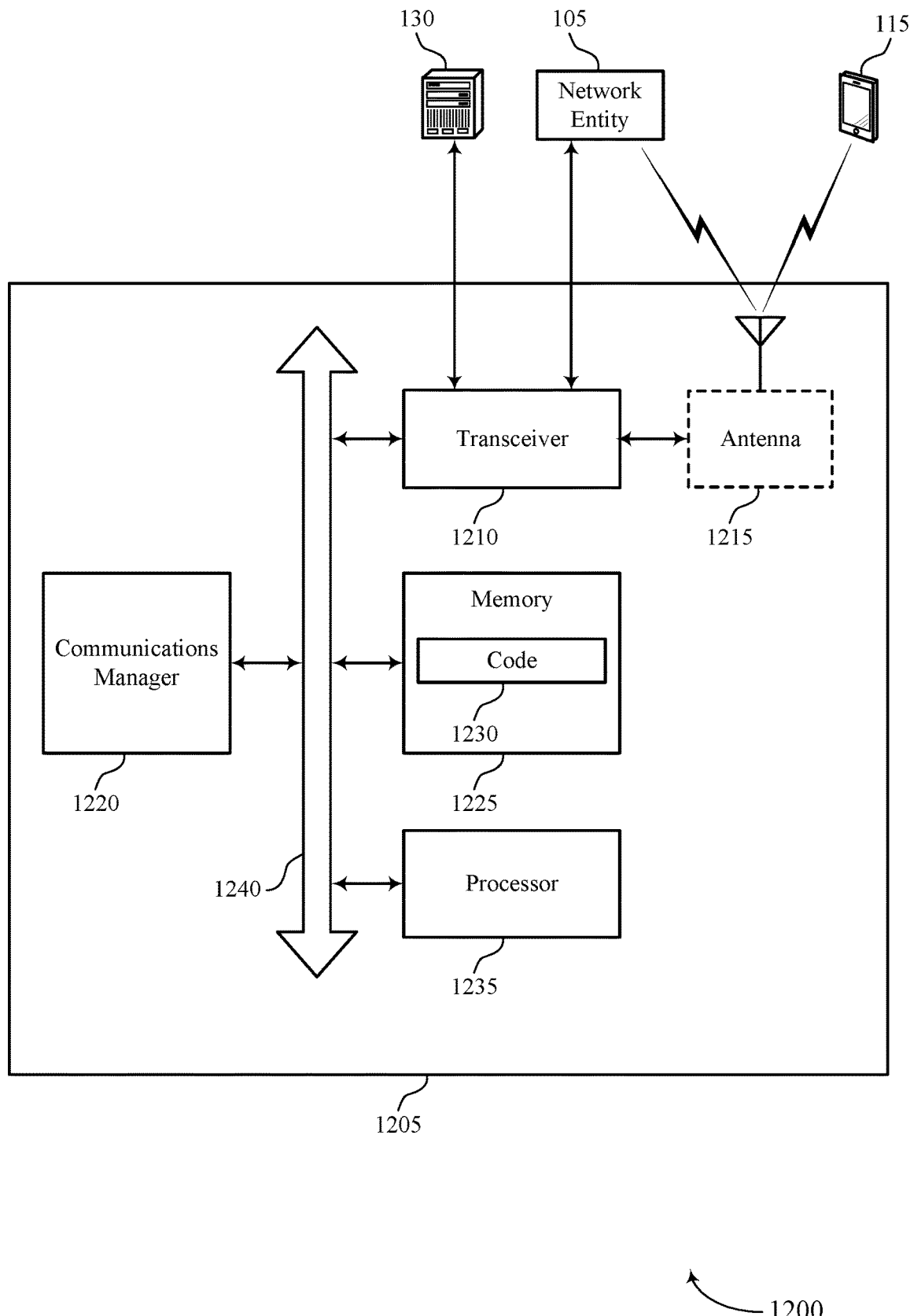
FIG. 12 shows a diagram of a system including a device that supports aperiodic TRS triggering mechanism to update TRS power in accordance with one or more aspects of the present disclosure.

FIG. 12 shows a diagram of a system 1200 including a device 1205 that supports aperiodic TRS triggering mechanism to update TRS power in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting aperiodic TRS triggering mechanism to update TRS power). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links).

For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting, to a UE, control signaling scheduling a set of multiple periodic TRSs and indicating a transmission power level for at least one of the set of multiple periodic TRSs. The communications manager 1220 may be configured as or otherwise support a means for transmitting, to the UE, a DCI message indicating an adjustment to the transmission power level and a resource allocated for an aperiodic TRS. The communications manager 1220 may be configured as or otherwise support a means for transmitting the aperiodic TRS using the resource in accordance with the DCI message. The communications manager 1220 may be configured as or otherwise support a means for receiving, from the UE, a message indicating a measurement of the aperiodic TRS in the resource based on the adjustment to the transmission power level.

By including or configuring the communications manager 1220 in accordance with examples as described herein, the device 1205 may support techniques for reduced power consumption, more efficient utilization of communication resources, and improved coordination between devices by enabling signaling of transmission power level adjustments for TRSs.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of aperiodic TRS triggering mechanism to update TRS power as described herein, or the processor 1235 and the memory 1225 may be otherwise configured to perform or support such operations.

Figure 13:
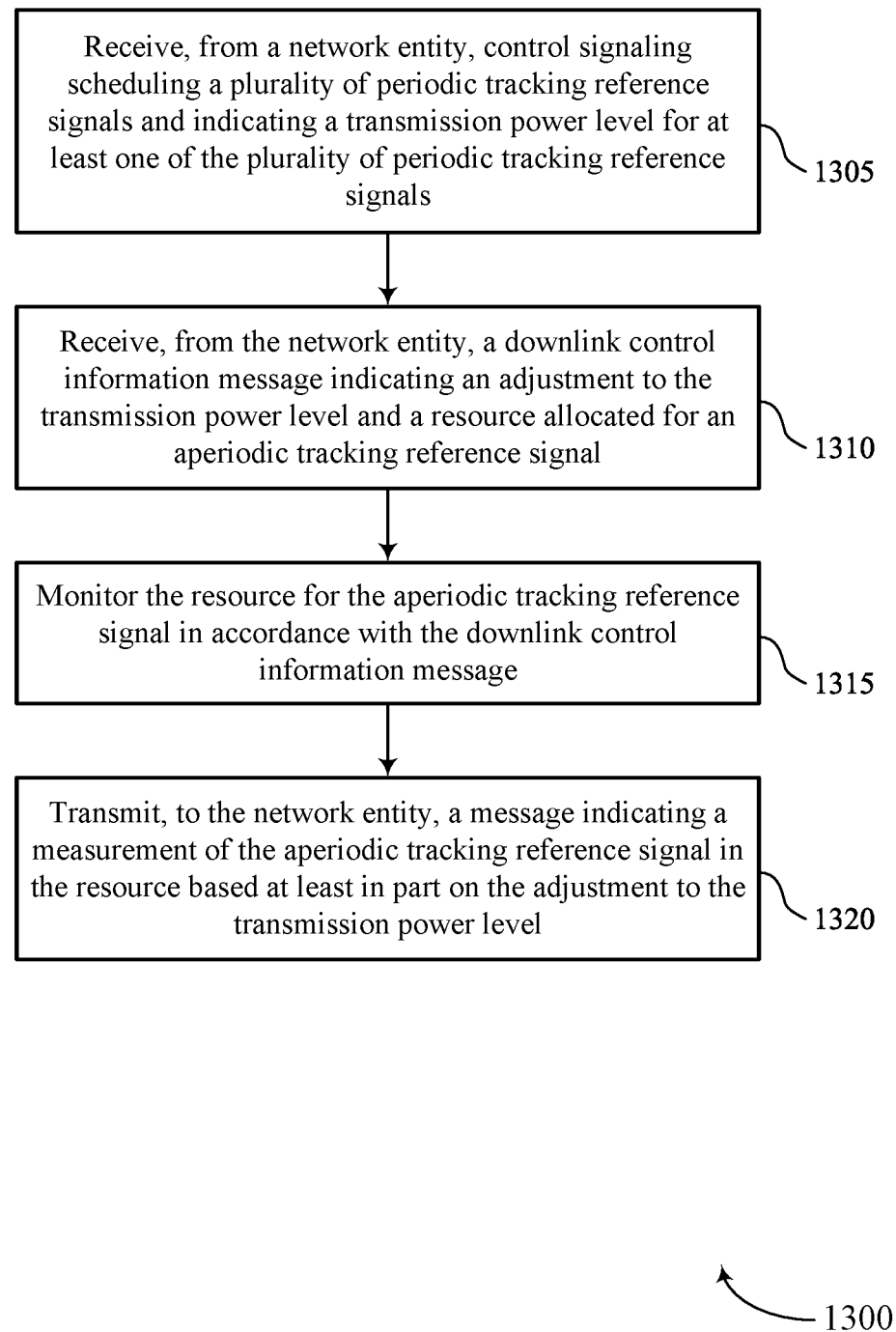
FIGS. 13 through 20 show flowcharts illustrating methods that support aperiodic TRS triggering mechanism to update TRS power in accordance with one or more aspects of the present disclosure.

FIG. 13 shows a flowchart illustrating a method 1300 that supports aperiodic TRS triggering mechanism to update TRS power in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, control signaling scheduling a set of multiple periodic TRSs and indicating a transmission power level for at least one of the set of multiple periodic TRSs. The operations of 1305 may be performed in accordance with examples as disclosed herein. In some examples, aspects of the operations of 1305 may be performed by an TRS scheduling manager 725 as described with reference to FIG. 7.

At 1310, the method may include receiving, from the network entity, a DCI message indicating an adjustment to the transmission power level and a resource allocated for an aperiodic TRS. The operations of 1310 may be performed in accordance with examples as disclosed herein. In some examples, aspects of the operations of 1310 may be performed by an TRS power level adjustment indication manager 730 as described with reference to FIG. 7.

At 1315, the method may include monitoring the resource for the aperiodic TRS in accordance with the DCI message. The operations of 1315 may be performed in accordance with examples as disclosed herein. In some examples, aspects of the operations of 1315 may be performed by an TRS monitoring manager 735 as described with reference to FIG. 7.

At 1320, the method may include transmitting, to the network entity, a message indicating a measurement of the aperiodic TRS in the resource based on the adjustment to the transmission power level. The operations of 1320 may be performed in accordance with examples as disclosed herein. In some examples, aspects of the operations of 1320 may be performed by an TRS measurement manager 740 as described with reference to FIG. 7.

Figure 14:
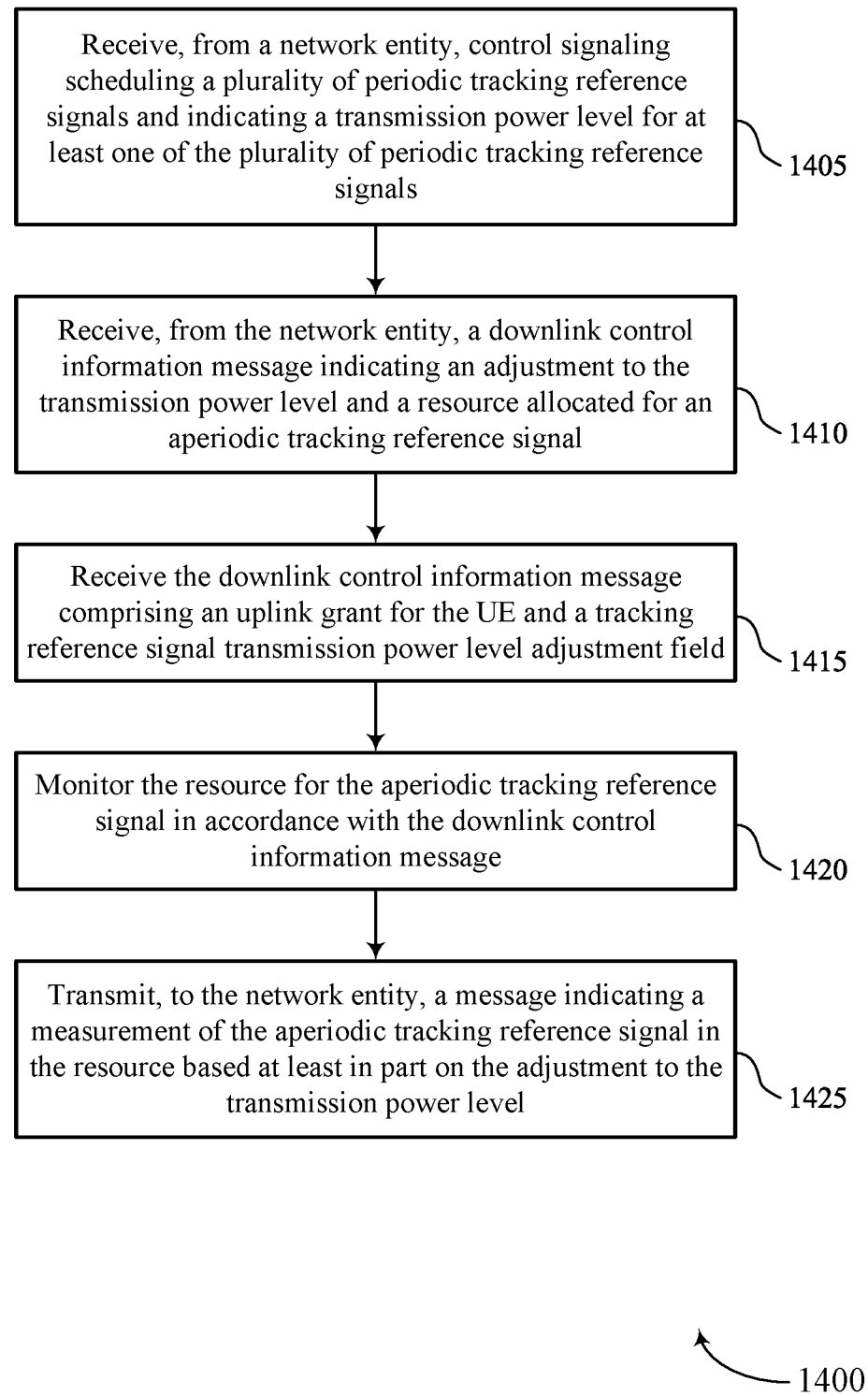

FIG. 14 shows a flowchart illustrating a method 1400 that supports aperiodic TRS triggering mechanism to update TRS power in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, control signaling scheduling a set of multiple periodic TRSs and indicating a transmission power level for at least one of the set of multiple periodic TRSs. The operations of 1405 may be performed in accordance with examples as disclosed herein. In some examples, aspects of the operations of 1405 may be performed by an TRS scheduling manager 725 as described with reference to FIG. 7.

At 1410, the method may include receiving, from the network entity, a DCI message indicating an adjustment to the transmission power level and a resource allocated for an aperiodic TRS. The operations of 1410 may be performed in accordance with examples as disclosed herein. In some examples, aspects of the operations of 1410 may be performed by an TRS power level adjustment indication manager 730 as described with reference to FIG. 7.

At 1415, the method may include receiving the DCI message including an uplink grant for the UE and a TRS transmission power level adjustment field. The operations of 1415 may be performed in accordance with examples as disclosed herein. In some examples, aspects of the operations of 1415 may be performed by a DCI manager 745 as described with reference to FIG. 7.

At 1420, the method may include monitoring the resource for the aperiodic TRS in accordance with the DCI message. The operations of 1420 may be performed in accordance with examples as disclosed herein. In some examples, aspects of the operations of 1420 may be performed by an TRS monitoring manager 735 as described with reference to FIG. 7.

At 1425, the method may include transmitting, to the network entity, a message indicating a measurement of the aperiodic TRS in the resource based on the adjustment to the transmission power level. The operations of 1425 may be performed in accordance with examples as disclosed herein. In some examples, aspects of the operations of 1425 may be performed by an TRS measurement manager 740 as described with reference to FIG. 7.

Figure 15:
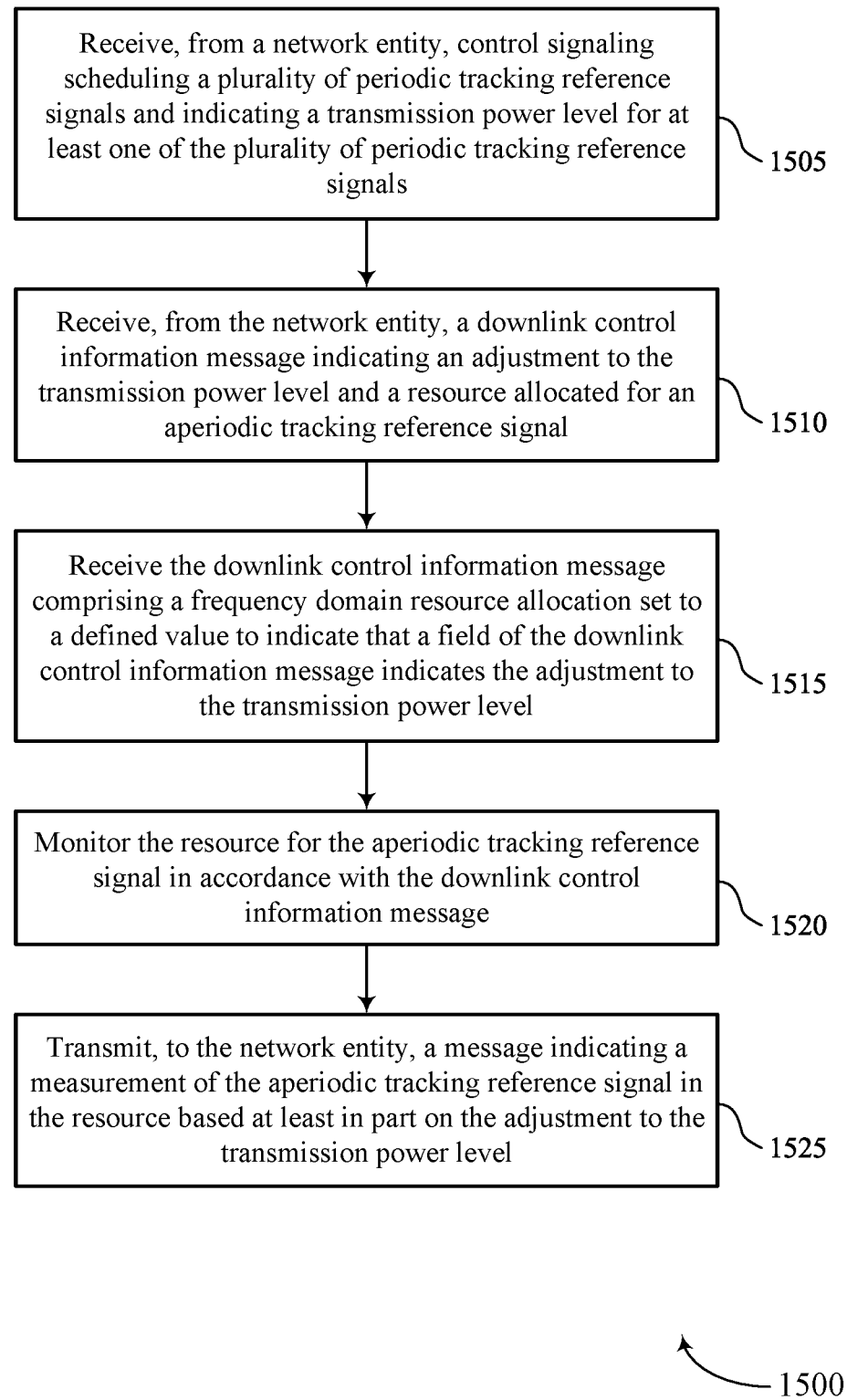

FIG. 15 shows a flowchart illustrating a method 1500 that supports aperiodic TRS triggering mechanism to update TRS power in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, control signaling scheduling a set of multiple periodic TRSs and indicating a transmission power level for at least one of the set of multiple periodic TRSs. The operations of 1505 may be performed in accordance with examples as disclosed herein. In some examples, aspects of the operations of 1505 may be performed by an TRS scheduling manager 725 as described with reference to FIG. 7.

At 1510, the method may include receiving, from the network entity, a DCI message indicating an adjustment to the transmission power level and a resource allocated for an aperiodic TRS. The operations of 1510 may be performed in accordance with examples as disclosed herein. In some examples, aspects of the operations of 1510 may be performed by an TRS power level adjustment indication manager 730 as described with reference to FIG. 7.

At 1515, the method may include receiving the DCI message including a frequency domain resource allocation set to a defined value to indicate that a field of the DCI message indicates the adjustment to the transmission power level. The operations of 1515 may be performed in accordance with examples as disclosed herein. In some examples, aspects of the operations of 1515 may be performed by a DCI manager 745 as described with reference to FIG. 7.

At 1520, the method may include monitoring the resource for the aperiodic TRS in accordance with the DCI message. The operations of 1520 may be performed in accordance with examples as disclosed herein. In some examples, aspects of the operations of 1520 may be performed by an TRS monitoring manager 735 as described with reference to FIG. 7.

At 1525, the method may include transmitting, to the network entity, a message indicating a measurement of the aperiodic TRS in the resource based on the adjustment to the transmission power level. The operations of 1525 may be performed in accordance with examples as disclosed herein. In some examples, aspects of the operations of 1525 may be performed by an TRS measurement manager 740 as described with reference to FIG. 7.

Figure 16:
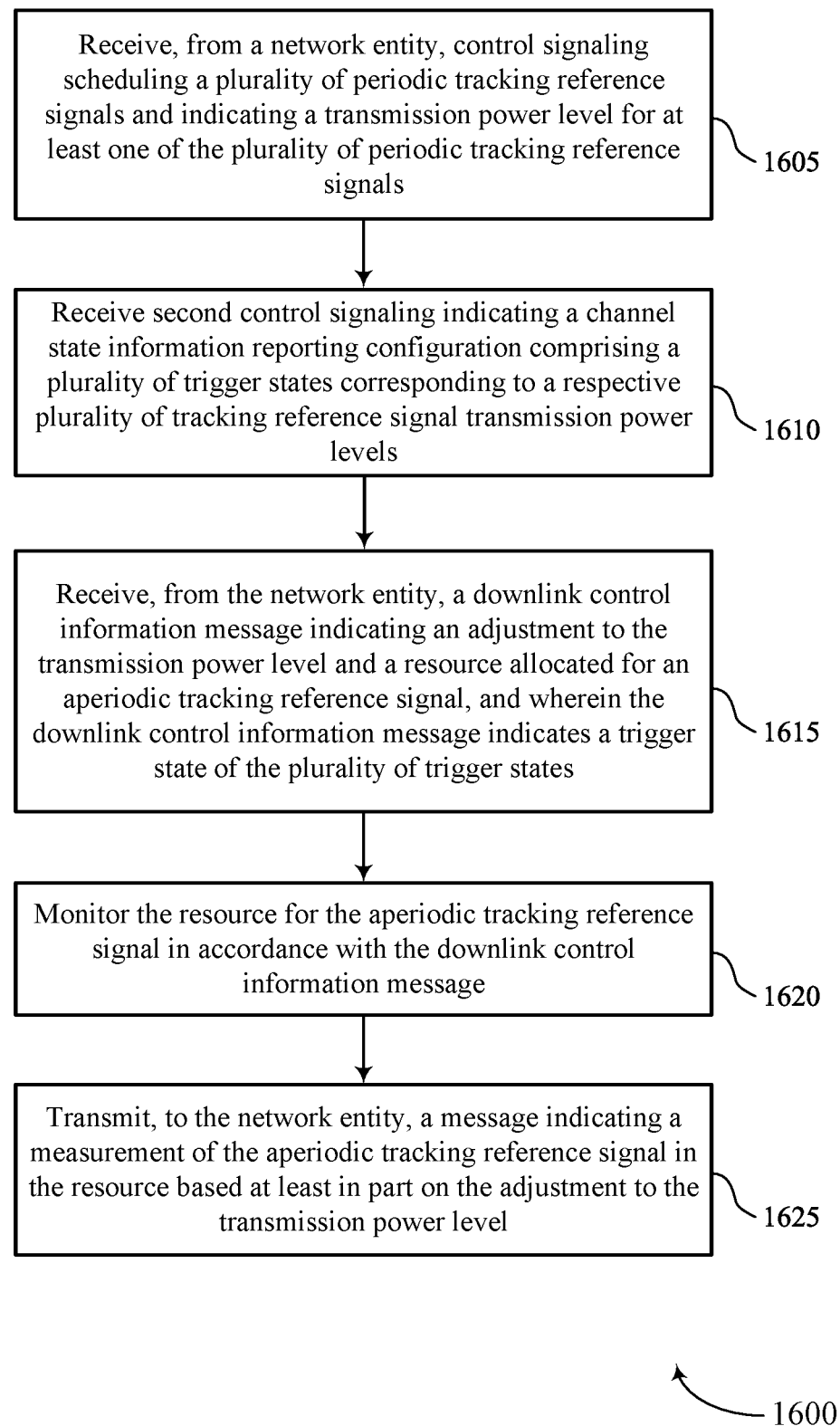

FIG. 16 shows a flowchart illustrating a method 1600 that supports aperiodic TRS triggering mechanism to update TRS power in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, control signaling scheduling a set of multiple periodic TRSs and indicating a transmission power level for at least one of the set of multiple periodic TRSs. The operations of 1605 may be performed in accordance with examples as disclosed herein. In some examples, aspects of the operations of 1605 may be performed by an TRS scheduling manager 725 as described with reference to FIG. 7.

At 1610, the method may include receiving second control signaling indicating a CSI reporting configuration including a set of multiple trigger states corresponding to a respective set of multiple TRS transmission power levels. The operations of 1610 may be performed in accordance with examples as disclosed herein. In some examples, aspects of the operations of 1610 may be performed by a CSI configuration manager 750 as described with reference to FIG. 7.

At 1615, the method may include receiving, from the network entity, a DCI message indicating an adjustment to the transmission power level and a resource allocated for an aperiodic TRS, and where the DCI message indicates a trigger state of the set of multiple trigger states. The operations of 1615 may be performed in accordance with examples as disclosed herein. In some examples, aspects of the operations of 1615 may be performed by an TRS power level adjustment indication manager 730 as described with reference to FIG. 7.

At 1620, the method may include monitoring the resource for the aperiodic TRS in accordance with the DCI message. The operations of 1620 may be performed in accordance with examples as disclosed herein. In some examples, aspects of the operations of 1620 may be performed by an TRS monitoring manager 735 as described with reference to FIG. 7.

At 1625, the method may include transmitting, to the network entity, a message indicating a measurement of the aperiodic TRS in the resource based on the adjustment to the transmission power level. The operations of 1625 may be performed in accordance with examples as disclosed herein. In some examples, aspects of the operations of 1625 may be performed by an TRS measurement manager 740 as described with reference to FIG. 7.

Figure 17:
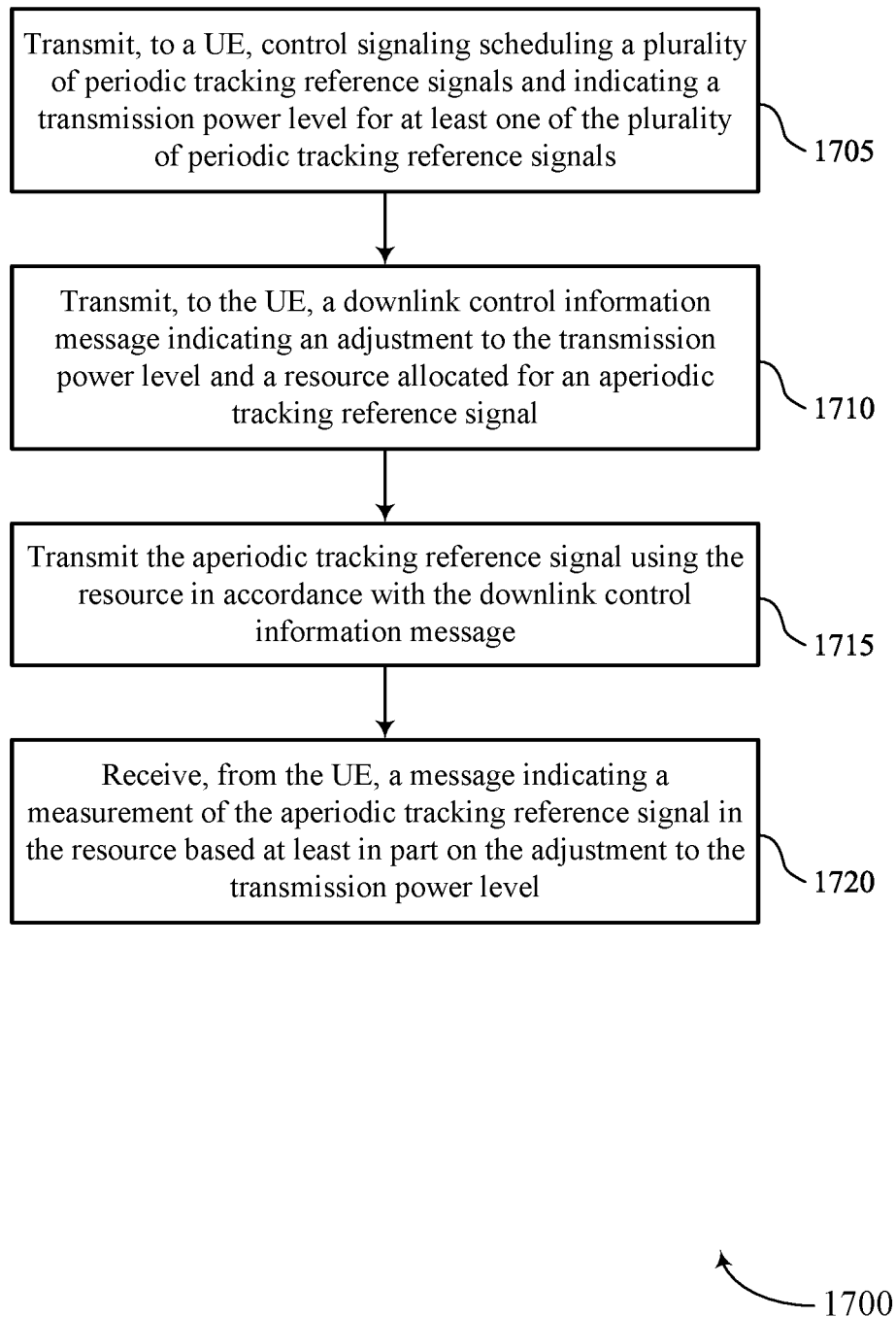

FIG. 17 shows a flowchart illustrating a method 1700 that supports aperiodic TRS triggering mechanism to update TRS power in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, control signaling scheduling a set of multiple periodic TRSs and indicating a transmission power level for at least one of the set of multiple periodic TRSs. The operations of 1705 may be performed in accordance with examples as disclosed herein. In some examples, aspects of the operations of 1705 may be performed by an TRS scheduling manager 1125 as described with reference to FIG. 11.

At 1710, the method may include transmitting, to the UE, a DCI message indicating an adjustment to the transmission power level and a resource allocated for an aperiodic TRS. The operations of 1710 may be performed in accordance with examples as disclosed herein. In some examples, aspects of the operations of 1710 may be performed by an TRS power level adjustment indication manager 1130 as described with reference to FIG. 11.

At 1715, the method may include transmitting the aperiodic TRS using the resource in accordance with the DCI message. The operations of 1715 may be performed in accordance with examples as disclosed herein. In some examples, aspects of the operations of 1715 may be performed by an TRS transmission manager 1135 as described with reference to FIG. 11.

At 1720, the method may include receiving, from the UE, a message indicating a measurement of the aperiodic TRS in the resource based on the adjustment to the transmission power level. The operations of 1720 may be performed in accordance with examples as disclosed herein. In some examples, aspects of the operations of 1720 may be performed by an TRS measurement manager 1140 as described with reference to FIG. 11.

Figure 18:
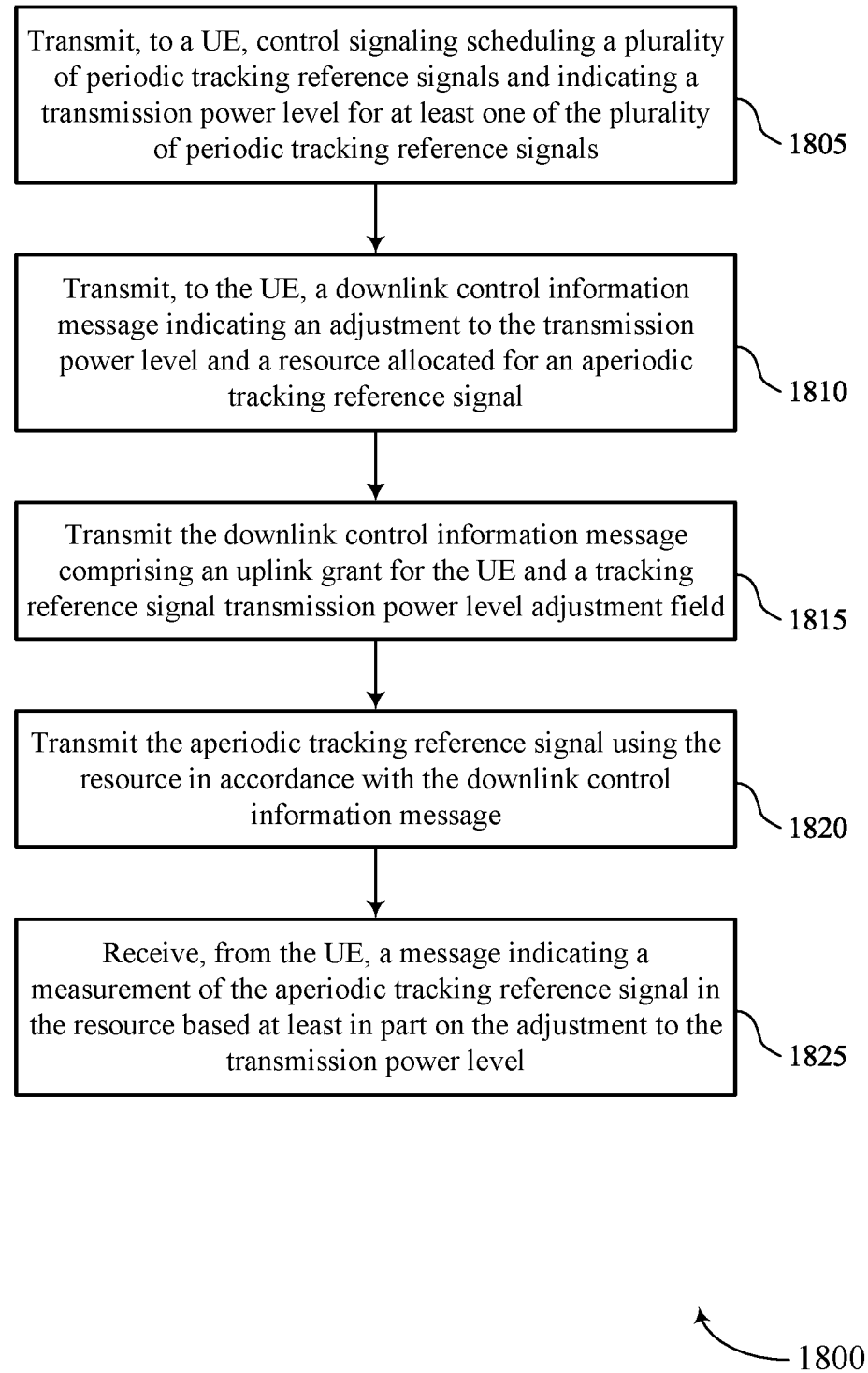

FIG. 18 shows a flowchart illustrating a method 1800 that supports aperiodic TRS triggering mechanism to update TRS power in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, control signaling scheduling a set of multiple periodic TRSs and indicating a transmission power level for at least one of the set of multiple periodic TRSs. The operations of 1805 may be performed in accordance with examples as disclosed herein. In some examples, aspects of the operations of 1805 may be performed by an TRS scheduling manager 1125 as described with reference to FIG. 11.

At 1810, the method may include transmitting, to the UE, a DCI message indicating an adjustment to the transmission power level and a resource allocated for an aperiodic TRS. The operations of 1810 may be performed in accordance with examples as disclosed herein. In some examples, aspects of the operations of 1810 may be performed by an TRS power level adjustment indication manager 1130 as described with reference to FIG. 11.

At 1815, the method may include transmitting the DCI message including an uplink grant for the UE and a TRS transmission power level adjustment field. The operations of 1815 may be performed in accordance with examples as disclosed herein. In some examples, aspects of the operations of 1815 may be performed by a DCI manager 1145 as described with reference to FIG. 11.

At 1820, the method may include transmitting the aperiodic TRS using the resource in accordance with the DCI message. The operations of 1820 may be performed in accordance with examples as disclosed herein. In some examples, aspects of the operations of 1820 may be performed by an TRS transmission manager 1135 as described with reference to FIG. 11.

At 1825, the method may include receiving, from the UE, a message indicating a measurement of the aperiodic TRS in the resource based on the adjustment to the transmission power level. The operations of 1825 may be performed in accordance with examples as disclosed herein. In some examples, aspects of the operations of 1825 may be performed by an TRS measurement manager 1140 as described with reference to FIG. 11.

Figure 19:
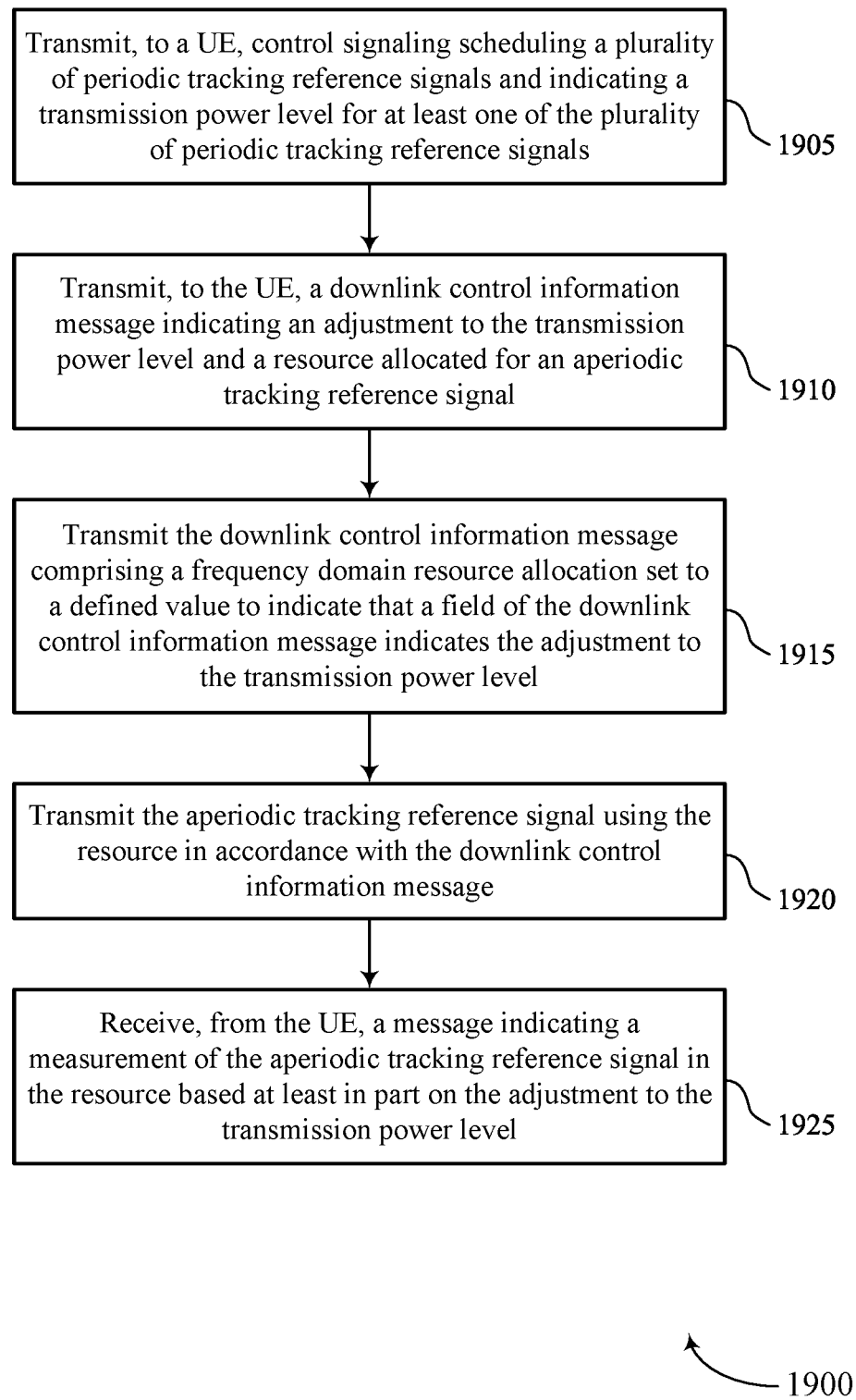

FIG. 19 shows a flowchart illustrating a method 1900 that supports aperiodic TRS triggering mechanism to update TRS power in accordance with one or more aspects of the present disclosure. The operations of the method 1900 may be implemented by a network entity or its components as described herein. For example, the operations of the method 1900 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, control signaling scheduling a set of multiple periodic TRSs and indicating a transmission power level for at least one of the set of multiple periodic TRSs. The operations of 1905 may be performed in accordance with examples as disclosed herein. In some examples, aspects of the operations of 1905 may be performed by an TRS scheduling manager 1125 as described with reference to FIG. 11.

At 1910, the method may include transmitting, to the UE, a DCI message indicating an adjustment to the transmission power level and a resource allocated for an aperiodic TRS. The operations of 1910 may be performed in accordance with examples as disclosed herein. In some examples, aspects of the operations of 1910 may be performed by an TRS power level adjustment indication manager 1130 as described with reference to FIG. 11.

At 1915, the method may include transmitting the DCI message including a frequency domain resource allocation set to a defined value to indicate that a field of the DCI message indicates the adjustment to the transmission power level. The operations of 1915 may be performed in accordance with examples as disclosed herein. In some examples, aspects of the operations of 1915 may be performed by a DCI manager 1145 as described with reference to FIG. 11.

At 1920, the method may include transmitting the aperiodic TRS using the resource in accordance with the DCI message. The operations of 1920 may be performed in accordance with examples as disclosed herein. In some examples, aspects of the operations of 1920 may be performed by an TRS transmission manager 1135 as described with reference to FIG. 11.

At 1925, the method may include receiving, from the UE, a message indicating a measurement of the aperiodic TRS in the resource based on the adjustment to the transmission power level. The operations of 1925 may be performed in accordance with examples as disclosed herein. In some examples, aspects of the operations of 1925 may be performed by an TRS measurement manager 1140 as described with reference to FIG. 11.

Figure 20:
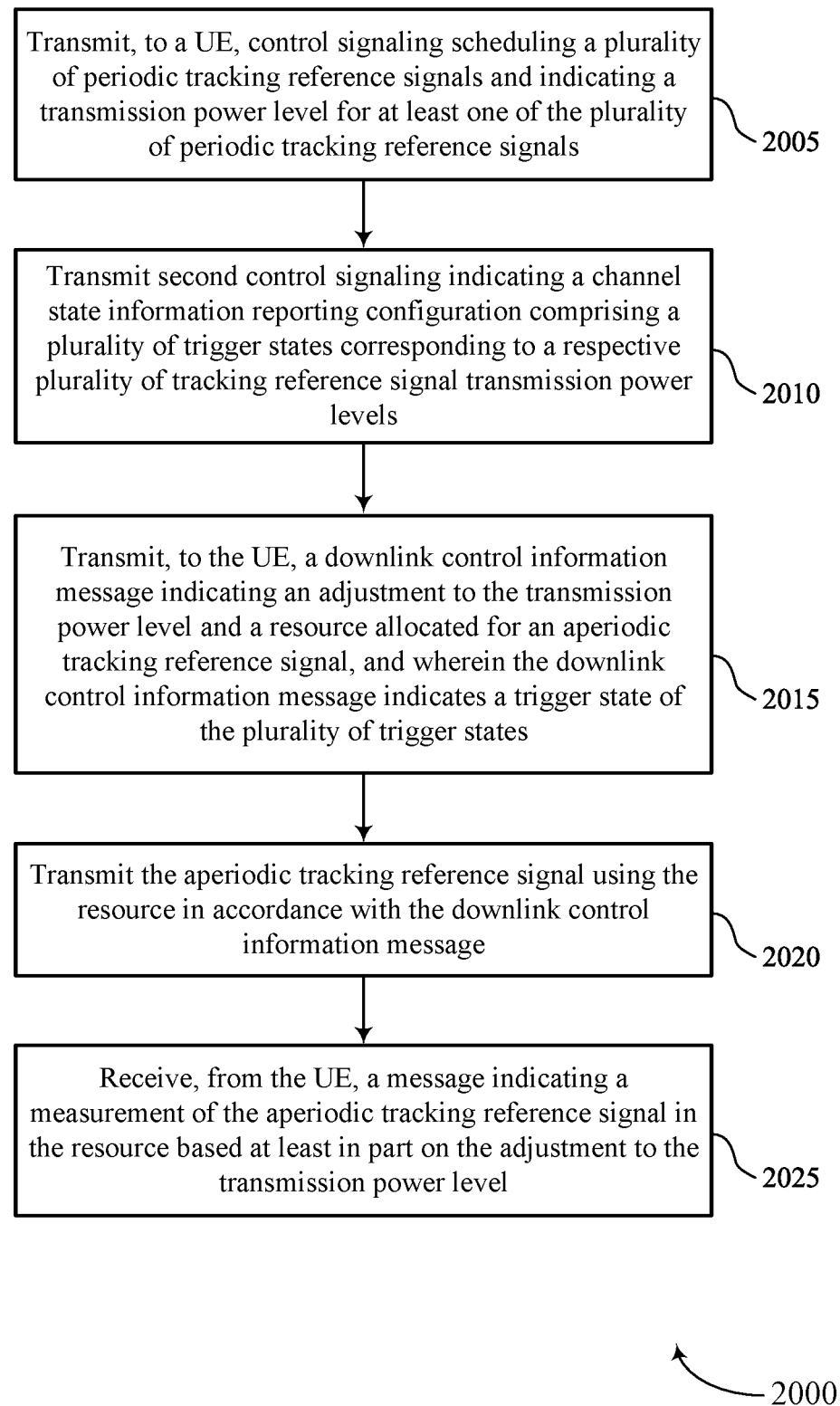

FIG. 20 shows a flowchart illustrating a method 2000 that supports aperiodic TRS triggering mechanism to update TRS power in accordance with one or more aspects of the present disclosure. The operations of the method 2000 may be implemented by a network entity or its components as described herein. For example, the operations of the method 2000 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a UE, control signaling scheduling a set of multiple periodic TRSs and indicating a transmission power level for at least one of the set of multiple periodic TRSs. The operations of 2005 may be performed in accordance with examples as disclosed herein. In some examples, aspects of the operations of 2005 may be performed by an TRS scheduling manager 1125 as described with reference to FIG. 11.

At 2010, the method may include transmitting second control signaling indicating a CSI reporting configuration including a set of multiple trigger states corresponding to a respective set of multiple TRS transmission power levels. The operations of 2010 may be performed in accordance with examples as disclosed herein. In some examples, aspects of the operations of 2010 may be performed by a CSI configuration manager 1150 as described with reference to FIG. 11.

At 2015, the method may include transmitting, to the UE, a DCI message indicating an adjustment to the transmission power level and a resource allocated for an aperiodic TRS, and where the DCI message indicates a trigger state of the set of multiple trigger states. The operations of 2015 may be performed in accordance with examples as disclosed herein. In some examples, aspects of the operations of 2015 may be performed by an TRS power level adjustment indication manager 1130 as described with reference to FIG. 11.

At 2020, the method may include transmitting the aperiodic TRS using the resource in accordance with the DCI message. The operations of 2020 may be performed in accordance with examples as disclosed herein. In some examples, aspects of the operations of 2020 may be performed by an TRS transmission manager 1135 as described with reference to FIG. 11.

At 2025, the method may include receiving, from the UE, a message indicating a measurement of the aperiodic TRS in the resource based on the adjustment to the transmission power level. The operations of 2025 may be performed in accordance with examples as disclosed herein. In some examples, aspects of the operations of 2025 may be performed by an TRS measurement manager 1140 as described with reference to FIG. 11.

The following provides an overview of aspects of the present disclosure:

Aspect 1: A method for wireless communications at a UE, comprising: receiving, from a network entity, control signaling scheduling a plurality of periodic TRSs and indicating a transmission power level for at least one of the plurality of periodic TRSs; receiving, from the network entity, a DCI message indicating an adjustment to the transmission power level and a resource allocated for an aperiodic TRS; monitoring the resource for the aperiodic TRS in accordance with the DCI message; and transmitting, to the network entity, a message indicating a measurement of the aperiodic TRS in the resource based at least in part on the adjustment to the transmission power level.

Aspect 2: The method of aspect 1, wherein receiving the DCI message indicating the adjustment to the transmission power level comprises: receiving the DCI message comprising an uplink grant for the UE and a TRS transmission power level adjustment field.

Aspect 3: The method of any of aspects 1 through 2, wherein receiving the DCI message indicating the adjustment to the transmission power level comprises: receiving the DCI message comprising an FDRA set to a defined value to indicate that a field of the DCI message indicates the adjustment to the transmission power level.

Aspect 4: The method of any of aspects 1 through 3, further comprising: receiving second control signaling indicating a channel state information reporting configuration comprising a plurality of trigger states corresponding to a respective plurality of TRS transmission power levels, and wherein the DCI message indicates a trigger state of the plurality of trigger states.

Aspect 5: The method of aspect 4, further comprising: generating a channel state information report in accordance with the channel state information reporting configuration and based at least in part on the adjustment to the transmission power level, wherein the message indicating the measurement of the aperiodic TRS comprises the channel state information report.

Aspect 6: The method of any of aspects 1 through 5, further comprising: receiving, with the control signaling, an indication of a duration for transmission power level adjustment, wherein the adjustment to the transmission power level applies to one or more periodic TRSs of the plurality of periodic TRSs scheduled for transmission within the duration after the DCI message indicating the adjustment to the transmission power level.

Aspect 7: The method of any of aspects 1 through 6, further comprising: receiving, with the control signaling, an indication that power level adjustments apply to one or more periodic TRSs of the plurality of periodic TRSs scheduled for transmission after a future adjustment to the transmission power level.

Aspect 8: The method of any of aspects 1 through 7, further comprising: receiving, with the DCI message, an indication of a duration for transmission power level adjustment, wherein the adjustment to the transmission power level applies to one or more periodic TRSs of the plurality of periodic TRSs scheduled for transmission within the duration after the DCI message indicating the adjustment to the transmission power level.

Aspect 9: The method of any of aspects 1 through 8, further comprising: receiving, with the DCI message, an indication that power level adjustments apply to one or more periodic TRSs of the plurality of periodic TRSs scheduled for transmission after a future adjustment to the transmission power level.

Aspect 10: The method of any of aspects 1 through 9, further comprising: performing a set of automatic gain control procedures based at least in part on the plurality of periodic TRSs and in accordance with the adjustment to the transmission power level.

Aspect 11: The method of any of aspects 1 through 10, wherein the DCI message indicates the adjustment to the transmission power level as an offset relative to a reference transmission power level.

Aspect 12: The method of any of aspects 1 through 11, wherein the DCI message indicates the adjustment to the transmission power level as an offset relative to the transmission power level of the at least one of the plurality of periodic TRSs.

Aspect 13: A method for wireless communications at a network entity, comprising: transmitting, to a UE, control signaling scheduling a plurality of periodic TRSs and indicating a transmission power level for at least one of the plurality of periodic TRSs; transmitting, to the UE, a DCI message indicating an adjustment to the transmission power level and a resource allocated for an aperiodic TRS; transmitting the aperiodic TRS using the resource in accordance with the DCI message; and receiving, from the UE, a message indicating a measurement of the aperiodic TRS in the resource based at least in part on the adjustment to the transmission power level.

Aspect 14: The method of aspect 13, wherein transmitting the DCI message indicating the adjustment to the transmission power level comprises: transmitting the DCI message comprising an uplink grant for the UE and a TRS transmission power level adjustment field.

Aspect 15: The method of any of aspects 13 through 14, wherein transmitting the DCI message indicating the adjustment to the transmission power level comprises: transmitting the DCI message comprising an FDRA set to a defined value to indicate that a field of the DCI message indicates the adjustment to the transmission power level.

Aspect 16: The method of any of aspects 13 through 15, further comprising: transmitting second control signaling indicating a channel state information reporting configuration comprising a plurality of trigger states corresponding to a respective plurality of TRS transmission power levels, and wherein the DCI message indicates a trigger state of the plurality of trigger states.

Aspect 17: The method of aspect 16, wherein receiving the message indicating the measurement of the aperiodic TRS in the resource comprises: receiving a channel state information report in accordance with the channel state information reporting configuration and based at least in part on the adjustment to the transmission power level.

Aspect 18: The method of any of aspects 13 through 17, further comprising: transmitting, with the control signaling, an indication of a duration for transmission power level adjustment, wherein the adjustment to the transmission power level applies to one or more periodic TRSs of the plurality of periodic TRSs scheduled for transmission within the duration after the DCI message indicating the adjustment to the transmission power level.

Aspect 19: The method of any of aspects 13 through 18, further comprising: transmitting, with the control signaling, an indication that power level adjustments apply to one or more periodic TRSs of the plurality of periodic TRSs scheduled for transmission after a future adjustment to the transmission power level.

Aspect 20: The method of any of aspects 13 through 19, further comprising: transmitting, with the DCI message, an indication of a duration for transmission power level adjustment, wherein the adjustment to the transmission power level applies to one or more periodic TRSs of the plurality of periodic TRSs scheduled for transmission within the duration after the DCI message indicating the adjustment to the transmission power level.

Aspect 21: The method of any of aspects 13 through 20, further comprising: transmitting, with the DCI message, an indication that power level adjustments apply to one or more periodic TRSs of the plurality of periodic TRSs scheduled for transmission after a future adjustment to the transmission power level.

Aspect 22: The method of any of aspects 13 through 21, wherein the DCI message indicates the adjustment to the transmission power level as an offset relative to a reference transmission power level.

Aspect 23: The method of any of aspects 13 through 22, wherein the DCI message indicates the adjustment to the transmission power level as an offset relative to the transmission power level of the at least one of the plurality of periodic TRSs.

Aspect 24: An apparatus for wireless communications at a UE, comprising a processor; memory coupled with the processor; and instructions stored in the memory and executable by the processor to cause the apparatus to perform a method of any of aspects 1 through 12.

Aspect 25: An apparatus for wireless communications at a UE, comprising at least one means for performing a method of any of aspects 1 through 12.

Aspect 26: A non-transitory computer-readable medium storing code for wireless communications at a UE, the code comprising instructions executable by a processor to perform a method of any of aspects 1 through 12.

Aspect 27: An apparatus for wireless communications at a network entity, comprising a processor; memory coupled with the processor; and instructions stored in the memory and executable by the processor to cause the apparatus to perform a method of any of aspects 13 through 23.

Aspect 28: An apparatus for wireless communications at a network entity, comprising at least one means for performing a method of any of aspects 13 through 23.

Aspect 29: A non-transitory computer-readable medium storing code for wireless communications at a network entity, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
receive, from a network entity, control signaling scheduling a plurality of periodic tracking reference signals and indicating a transmission power level for at least one of the plurality of periodic tracking reference signals;
receive, from the network entity, a downlink control information message indicating an adjustment to the transmission power level and a resource allocated for an aperiodic tracking reference signal;
monitor the resource for the aperiodic tracking reference signal in accordance with the downlink control information message; and
transmit, to the network entity, a message indicating a measurement of the aperiodic tracking reference signal in the resource based at least in part on the adjustment to the transmission power level.

2. The apparatus of claim 1, wherein the instructions to receive the downlink control information message indicating the adjustment to the transmission power level are executable by the processor to cause the apparatus to:
receive the downlink control information message comprising an uplink grant for the UE and a tracking reference signal transmission power level adjustment field.

3. The apparatus of claim 1, wherein the instructions to receive the downlink control information message indicating the adjustment to the transmission power level are executable by the processor to cause the apparatus to:
receive the downlink control information message comprising a frequency domain resource allocation set to a defined value to indicate that a field of the downlink control information message indicates the adjustment to the transmission power level.

4. The apparatus of claim 1, wherein the instructions are further executable by the processor to cause the apparatus to:
receive second control signaling indicating a channel state information reporting configuration comprising a plurality of trigger states corresponding to a respective plurality of tracking reference signal transmission power levels, and wherein the downlink control information message indicates a trigger state of the plurality of trigger states.

5. The apparatus of claim 4, wherein the instructions are further executable by the processor to cause the apparatus to:
generate a channel state information report in accordance with the channel state information reporting configuration and based at least in part on the adjustment to the transmission power level, wherein the message indicating the measurement of the aperiodic tracking reference signal comprises the channel state information report.

6. The apparatus of claim 1, wherein the instructions are further executable by the processor to cause the apparatus to:
receive, with the control signaling, an indication of a duration for transmission power level adjustment, wherein the adjustment to the transmission power level applies to one or more periodic tracking reference signals of the plurality of periodic tracking reference signals scheduled for transmission within the duration after the downlink control information message indicating the adjustment to the transmission power level.

7. The apparatus of claim 1, wherein the instructions are further executable by the processor to cause the apparatus to:
receive, with the control signaling, an indication that power level adjustments apply to one or more periodic tracking reference signals of the plurality of periodic tracking reference signals scheduled for transmission after a future adjustment to the transmission power level.

8. The apparatus of claim 1, wherein the instructions are further executable by the processor to cause the apparatus to:
receive, with the downlink control information message, an indication of a duration for transmission power level adjustment, wherein the adjustment to the transmission power level applies to one or more periodic tracking reference signals of the plurality of periodic tracking reference signals scheduled for transmission within the duration after the downlink control information message indicating the adjustment to the transmission power level.

9. The apparatus of claim 1, wherein the instructions are further executable by the processor to cause the apparatus to:
receive, with the downlink control information message, an indication that power level adjustments apply to one or more periodic tracking reference signals of the plurality of periodic tracking reference signals scheduled for transmission after a future adjustment to the transmission power level.

10. The apparatus of claim 1, wherein the instructions are further executable by the processor to cause the apparatus to:
perform a set of automatic gain control procedures based at least in part on the plurality of periodic tracking reference signals and in accordance with the adjustment to the transmission power level.

11. The apparatus of claim 1, wherein the downlink control information message indicates the adjustment to the transmission power level as an offset relative to a reference transmission power level.

12. The apparatus of claim 1, wherein the downlink control information message indicates the adjustment to the transmission power level as an offset relative to the transmission power level of the at least one of the plurality of periodic tracking reference signals.

13. An apparatus for wireless communications at a network entity, comprising:
a processor;
memory coupled with the processor; and
instructions stored in the memory and executable by the processor to cause the apparatus to:
transmit, to a user equipment (UE), control signaling scheduling a plurality of periodic tracking reference signals and indicating a transmission power level for at least one of the plurality of periodic tracking reference signals;
transmit, to the UE, a downlink control information message indicating an adjustment to the transmission power level and a resource allocated for an aperiodic tracking reference signal;
transmit the aperiodic tracking reference signal using the resource in accordance with the downlink control information message; and
receive, from the UE, a message indicating a measurement of the aperiodic tracking reference signal in the resource based at least in part on the adjustment to the transmission power level.

14. The apparatus of claim 13, wherein the instructions to transmit the downlink control information message indicating the adjustment to the transmission power level are executable by the processor to cause the apparatus to:
transmit the downlink control information message comprising an uplink grant for the UE and a tracking reference signal transmission power level adjustment field.

15. The apparatus of claim 13, wherein the instructions to transmit the downlink control information message indicating the adjustment to the transmission power level are executable by the processor to cause the apparatus to:
transmit the downlink control information message comprising a frequency domain resource allocation set to a defined value to indicate that a field of the downlink control information message indicates the adjustment to the transmission power level.

16. The apparatus of claim 13, wherein the instructions are further executable by the processor to cause the apparatus to:
transmit second control signaling indicating a channel state information reporting configuration comprising a plurality of trigger states corresponding to a respective plurality of tracking reference signal transmission power levels, and wherein the downlink control information message indicates a trigger state of the plurality of trigger states.

17. The apparatus of claim 16, wherein the instructions to receive the message indicating the measurement of the aperiodic tracking reference signal in the resource are executable by the processor to cause the apparatus to:
  receive a channel state information report in accordance with the channel state information reporting configuration and based at least in part on the adjustment to the transmission power level.

18. The apparatus of claim 13, wherein the instructions are further executable by the processor to cause the apparatus to:
  transmit, with the control signaling, an indication of a duration for transmission power level adjustment, wherein the adjustment to the transmission power level applies to one or more periodic tracking reference signals of the plurality of periodic tracking reference signals scheduled for transmission within the duration after the downlink control information message indicating the adjustment to the transmission power level.

19. The apparatus of claim 13, wherein the instructions are further executable by the processor to cause the apparatus to:
  transmit, with the control signaling, an indication that power level adjustments apply to one or more periodic tracking reference signals of the plurality of periodic tracking reference signals scheduled for transmission after a future adjustment to the transmission power level.

20. The apparatus of claim 13, wherein the instructions are further executable by the processor to cause the apparatus to:
  transmit, with the downlink control information message, an indication of a duration for transmission power level adjustment, wherein the adjustment to the transmission power level applies to one or more periodic tracking reference signals of the plurality of periodic tracking reference signals scheduled for transmission within the duration after the downlink control information message indicating the adjustment to the transmission power level.

21. The apparatus of claim 13, wherein the instructions are further executable by the processor to cause the apparatus to:
  transmit, with the downlink control information message, an indication that power level adjustments apply to one or more periodic tracking reference signals of the plurality of periodic tracking reference signals scheduled for transmission after a future adjustment to the transmission power level.

22. The apparatus of claim 13, wherein the downlink control information message indicates the adjustment to the transmission power level as an offset relative to a reference transmission power level.

23. The apparatus of claim 13, wherein the downlink control information message indicates the adjustment to the transmission power level as an offset relative to the transmission power level of the at least one of the plurality of periodic tracking reference signals.

24. A method for wireless communications at a user equipment (UE), comprising:
  receiving, from a network entity, control signaling scheduling a plurality of periodic tracking reference signals and indicating a transmission power level for at least one of the plurality of periodic tracking reference signals;
  receiving, from the network entity, a downlink control information message indicating an adjustment to the transmission power level and a resource allocated for an aperiodic tracking reference signal;
  monitoring the resource for the aperiodic tracking reference signal in accordance with the downlink control information message; and
  transmitting, to the network entity, a message indicating a measurement of the aperiodic tracking reference signal in the resource based at least in part on the adjustment to the transmission power level.

25. The method of claim 24, wherein receiving the downlink control information message indicating the adjustment to the transmission power level comprises:
  receiving the downlink control information message comprising an uplink grant for the UE and a tracking reference signal transmission power level adjustment field.

26. The method of claim 24, wherein receiving the downlink control information message indicating the adjustment to the transmission power level comprises:
  receiving the downlink control information message comprising a frequency domain resource allocation set to a defined value to indicate that a field of the downlink control information message indicates the adjustment to the transmission power level.

27. The method of claim 24, further comprising:
  receiving second control signaling indicating a channel state information reporting configuration comprising a plurality of trigger states corresponding to a respective plurality of tracking reference signal transmission power levels, and wherein the downlink control information message indicates a trigger state of the plurality of trigger states.

28. The method of claim 27, further comprising:
  generating a channel state information report in accordance with the channel state information reporting configuration and based at least in part on the adjustment to the transmission power level, wherein the message indicating the measurement of the aperiodic tracking reference signal comprises the channel state information report.

29. The method of claim 24, further comprising:
  receiving, with the control signaling, an indication of a duration for transmission power level adjustment, wherein the adjustment to the transmission power level applies to one or more periodic tracking reference signals of the plurality of periodic tracking reference signals scheduled for transmission within the duration after the downlink control information message indicating the adjustment to the transmission power level.

30. A method for wireless communications at a network entity, comprising:
  transmitting, to a user equipment (UE), control signaling scheduling a plurality of periodic tracking reference signals and indicating a transmission power level for at least one of the plurality of periodic tracking reference signals;
  transmitting, to the UE, a downlink control information message indicating an adjustment to the transmission power level and a resource allocated for an aperiodic tracking reference signal;
  transmitting the aperiodic tracking reference signal using the resource in accordance with the downlink control information message; and
  receiving, from the UE, a message indicating a measurement of the aperiodic tracking reference signal in the resource based at least in part on the adjustment to the transmission power level.

* * * * *